United States Patent
Peak et al.

(10) Patent No.: US 7,178,137 B1
(45) Date of Patent: Feb. 13, 2007

(54) AUTOMATIC VERIFICATION OF SCHEDULING DOMAIN CONSISTENCY

(75) Inventors: Christopher Peak, San Jose, CA (US); Sathya Bettadapura, Campbell, CA (US); Jeffrey Kimmel, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1148 days.

(21) Appl. No.: 09/828,284

(22) Filed: Apr. 5, 2001

(51) Int. Cl.
G06F 9/44 (2006.01)
G06F 9/45 (2006.01)

(52) U.S. Cl. .................. 717/131; 717/141; 717/148; 717/149

(58) Field of Classification Search ........ 717/124–151, 717/141, 148; 714/37–39
See application file for complete search history.

(56) References Cited

U.S. PATENT DOCUMENTS

| | | | |
|---|---|---|---|
| 4,333,144 A | 6/1982 | Whiteside et al. | |
| 4,459,664 A | 7/1984 | Pottier et al. | |
| 4,488,231 A | 12/1984 | Yu et al. | |
| 4,494,188 A | 1/1985 | Nakane et al. | |
| 4,742,447 A | 5/1988 | Duvall et al. | |

(Continued)

FOREIGN PATENT DOCUMENTS

DE 694 25 658 T2 4/2001

(Continued)

OTHER PUBLICATIONS

Dianne E. Britton and Mark E. Stickel; An Interprocess Communication Facility for Distributed Applications; RCE Laboratories; David Sarnoff Research Center; Princeton, New Jersey; IEEE 1980; pp. 590-595.

(Continued)

*Primary Examiner*—Tuan Dam
*Assistant Examiner*—Chuck Kendall
(74) *Attorney, Agent, or Firm*—Blakely, Sokoloff, Taylor, & Zafman LLP

(57) ABSTRACT

An analyzer that analyzes instructions and data to determine where the instructions and data might result in incorrect results when run on a multiprocessor system. The instructions and data are divided into plural domains based on the symbols used to refer to those instructions and data, and the multiprocessor system is configured to use at most one processor at a time to execute instructions and to access data from any one domain. The analyzer preferably includes a reference analyzer and a table generator. The reference analyzer determines which of the instructions and data involve references outside of their domains, and determines which of the references outside of their domains are multiprocessor unsafe references. The report generator generates a report of the multiprocessor unsafe references. Also, a checker that dynamically determines where instructions and data result in domain violations when run on a multiprocessor system. The checker includes an interface to a table of purportedly microprocessor safe references by the instructions and data outside of their domains. The table preferably includes the domains to which the references are supposed to refer. The checker also includes a reference tracker that tracks references made by the instructions and data, and a comparator that determines, when a reference in the table of purportedly microprocessor safe references is encountered during execution of the instructions and data, if the reference is actually to a domain to which that reference is supposed to refer.

111 Claims, 12 Drawing Sheets

U.S. PATENT DOCUMENTS

| | | | |
|---|---|---|---|
| 4,742,450 A | | 5/1988 | Duvall et al. |
| 4,875,159 A | | 10/1989 | Cary et al. |
| 4,914,583 A | | 4/1990 | Weisshaar et al. |
| 5,043,873 A | | 8/1991 | Muramatsu et al. |
| 5,253,359 A | | 10/1993 | Spix et al. |
| 5,280,614 A | | 1/1994 | Munroe et al. |
| 5,297,265 A | | 3/1994 | Frank et al. |
| 5,307,483 A | | 4/1994 | Knipfer et al. |
| 5,327,556 A | | 7/1994 | Mohan et al. |
| 5,357,612 A | | 10/1994 | Alaiwan |
| 5,454,095 A | | 9/1995 | Kraemer et al. |
| 5,481,706 A | | 1/1996 | Peek |
| 5,481,747 A | | 1/1996 | Kametani |
| 5,502,840 A | | 3/1996 | Barton |
| 5,590,326 A | | 12/1996 | Manabe |
| 5,644,709 A | * | 7/1997 | Austin ................. 714/53 |
| 5,790,851 A | | 8/1998 | Frank et al. |
| 5,815,727 A | | 9/1998 | Motomura |
| 5,826,081 A | | 10/1998 | Zolnowsky |
| 5,872,909 A | * | 2/1999 | Wilner et al. .......... 714/38 |
| 5,894,555 A | | 4/1999 | Harada et al. |
| 5,940,828 A | | 8/1999 | Anaya et al. |
| 5,963,962 A | | 10/1999 | Hitz et al. |
| 6,105,053 A | | 8/2000 | Kimmel et al. |
| 6,151,618 A | * | 11/2000 | Wahbe et al. ............ 718/1 |
| 6,269,390 B1 | | 7/2001 | Boland |
| 6,289,369 B1 | | 9/2001 | Sundaresan |
| 6,345,240 B1 | | 2/2002 | Havens |
| 6,378,066 B1 | | 4/2002 | Lewis |
| 6,470,375 B1 | | 10/2002 | Whitner et al. |
| 6,502,122 B1 | | 12/2002 | Takeuchi |
| 6,604,123 B1 | | 8/2003 | Bruno et al. |
| 6,622,155 B1 | | 9/2003 | Haddon et al. |
| 6,662,252 B1 | | 12/2003 | Marshall et al. |
| 6,714,960 B1 | | 3/2004 | Bitar et al. |
| 6,728,959 B1 | | 4/2004 | Merkey |
| 6,779,182 B1 | | 8/2004 | Zolnowsky |
| 2001/0037408 A1 | | 11/2001 | Thrift et al. |
| 2001/0037450 A1 | * | 11/2001 | Metlitski et al. ............ 713/152 |
| 2001/0042139 A1 | | 11/2001 | Jeffords et al. |
| 2002/0026342 A1 | | 2/2002 | Lane et al. |
| 2002/0091748 A1 | | 7/2002 | Rehg et al. |
| 2004/0117531 A1 | | 6/2004 | McKenney |

FOREIGN PATENT DOCUMENTS

| | | |
|---|---|---|
| EP | 145889 A2 | 6/1985 |
| EP | 0 702 815 B1 | 8/2000 |
| JP | 2001 167060 A | 6/2001 |
| WO | WO 94/29807 A1 | 12/1994 |

OTHER PUBLICATIONS

David R. Cheriton; Multi-Process Structuring and the Thoth Operating System; Development of Computer Science; University of British Columbia, Vancouver, B.C. Canada; Mar. 1979, pp. 1-64.

David R. Cheriton; The Thoth System: Multi-Process Structuring and Portablility; Operating and Programming Systems Series; The Computer Science Library.

David R. Cheriton et al.; Thoth, A Portable Real-Time Operating System; vol. 22; Feb. 1979; pp. 105-115. Operations Systems, Communications of the ACM, University of Waterloo.

Anita K. Jones et al.; StarOS, a Multiprocessor Operating System for the Support of Task Forces; Department of Computer Science Carnegie-Mellon University, Pittsburg, Pennsylvania; 1979.

Keith A. Lantz et al.; Rochester's Intelligent Gateway; IEEE; Oct. 1982.

Michael A. Malcolm; A Process Abstraction and its Application; Department of Computer Science; University of Waterloo; Waterloo, Ontario; Proc. Eighth Manitoba Conference on Numerical Math. and Computing, 1978; pp. 33-50.

Bruce Nelson and Yu-Ping Cheng; The Myth of Transfer Rate-How and Why SCSI Is Better than IPI for NFS; Technical Report 6, Second Edition-Auspex; July 1992.

Slashdot: Tux2: The Filesystem That Would Be King—Microsoft Internet Explorer. Oct. 20, 2000.

"IA-32 Intel Architecture Software Developer's Manual, vol. 3: System Programming Guide," 2004, 26 pgs., Intel Corporation.

* cited by examiner

AUTOMATIC VERIFICATION OF SCHEDULING DOMAIN CONSISTENCY

BACKGROUND OF THE INVENTION

1. Field of the Invention

The invention relates to automatic verification of correct partitioning of instructions and data for execution in a multiprocessor environment. In particular, the invention relates to analyzing the instructions and data to detect domain violations.

2. Related Art

Parallel processing is a known technique in which a particular piece of software is run on plural processors at once in order to achieve faster execution. In known systems, special care must be taken when writing code for a multiprocessor environment. Otherwise, processes running on each of the plural processors might interfere with each other.

One technique for writing code specifically for a multiprocessor environment is to assure that all separate "tasks" in the code can safely run simultaneously (that is, are "multiprocessor-safe"). Unfortunately, for large and complex software, making this assurance can involve a tremendous coding effort. In addition, code for such software can be so complex that properly defining tasks that are multiprocessor-safe is simply infeasible.

Furthermore, a vast amount of code exists that is designed for a one-processor environment. Converting such code into multiprocessor-safe code for a multiprocessor environment using traditional techniques also can involve a tremendous coding effort. In some circumstances, converting the code can involve more effort than re-writing the code. As a result, the advantages of multiprocessing are not realized or available for many existing applications.

SUMMARY OF THE INVENTION

The invention addresses the foregoing deficiencies of the art by providing a technique for analyzing instructions and data to determine where the instructions and data might be "unsafe" for execution in a multiprocessing environment. Separate processing "domains" are defined, such that instructions and data within each domain need not be multiprocessor-safe, but such that instructions and data in separate domains are, by the nature of the domain separation, multiprocessor safe. According to the invention, domains are defined based on the symbols used to refer to those instructions and data. This technique is different from known old techniques in which domains are defined based on locations of instructions and data within a particular piece of software. Preferably, the domains are defined such that instructions and data executing in separate domains tend not to interfere with each other.

In a preferred embodiment, a domain includes a set of instructions and the data utilized by the instructions. Domains preferably are defined based on files that define the instructions. In a preferred embodiment, the domain definitions are set forth in a makefile, which includes a list of files assigned to each domain. Instructions and data defined by those listed files are assigned to the domains.

The multiprocessor system is configured according to the invention to execute instructions and to access data from any one domain using at most one processor at any time. Thus, instructions and data from different parts of a domain cannot interfere with each other because those instructions and data cannot be executed simultaneously.

Domain violations occur when instructions or data in one domain reference instructions or data in another domain in a manner which is not multiprocessor safe, that is, which can result in interference between instructions. The invention provides a technique for analyzing instructions and data for such domain violations, for determining if the domain violations might result in processing errors, and for dynamically checking the domain separation of the instructions and data at run time.

Accordingly, one aspect of the invention is embodied in an analyzer that analyzes instructions and data to determine where the instructions and data might result in incorrect results when run on a multiprocessor system. The instructions and data are divided into plural domains based on the symbols used to refer to those instructions and data, and the multiprocessor system is configured to use at most one processor at a time to execute instructions and to access data from any one domain. The analyzer preferably includes a reference analyzer and a report generator. The reference analyzer determines which of the instructions and data involve references outside of their domains, and determines which of the references outside of their domains are multiprocessor unsafe references. The report generator generates a report of the potentially multiprocessor unsafe references. In a preferred embodiment, the analyzer also includes a table generator that generates a table of purportedly safe inter-domain references for use by a checker according to the invention.

Preferably, the analyzer also includes a modifier that modifies the instructions and data based on the report. In one embodiment of the invention, the determining steps, the generating step, and the modifying step are repeated until none of the references are determined to be multiprocessor unsafe references, whereby code originally written for a single processor system is modified to be suitable for use on a multiprocessor system.

Another aspect of the invention is embodied in a checker that dynamically determines where instructions and data result in domain violations when run on a multiprocessor system. The instructions and data are divided into plural domains based on the symbols used to refer to those instructions and data, and the multiprocessor system is configured to use at most one processor at a time to execute instructions and to access data from any one domain. The checker includes an interface to a table of purportedly microprocessor safe references by the instructions and data outside of their domains. The table preferably includes the domains to which the references are supposed to refer. The checker also includes a reference tracker that tracks references made by the instructions and data, and a comparator that determines, when a reference in the table of purportedly microprocessor safe references is encountered during execution of the instructions and data, if the reference is actually to a domain to which that reference is supposed to refer.

Preferably, if the checker determines that a reference is not to a domain to which the table indicates that reference is supposed to refer, the checker halts execution of the data and instructions.

In another embodiment, the analyzer and the checker are combined. In this embodiment, analysis of the instructions and data according to the invention also generates the table of purportedly safe references used to check for domain violations at run time.

The invention also concerns the definitions of the domains, preferably through makefiles, the report of multiprocessor unsafe inter-domain references, the table of purportedly safe references generated by the analyzer and used by the checker, and other data structures used by the invention.

The invention further concerns various embodiments of the invention tailored to analyzing and checking different formats of instructions and data. These different formats of instructions and data include but are not limited to source code, object code, executable code, interpretable code, and code for execution by a virtual machine.

In a more general sense, the invention is broadly applicable to any situation where instructions and data share multiple resources of a type used concurrently. For example, these multiple resources could be multiple network interfaces or multiple interfaces to storage devices.

The invention also encompasses methods used by the analyzer and checker and implementations of the analyzer and checker stored as executable steps in memories such as removable memories (e.g., diskettes or CD-ROMs), fixed disks, and/or physical memory (e.g., RAM or ROM).

This summary has been provided so that the nature of the invention may be understood quickly. A more complete understanding of the invention may be obtained by reference to the following description of the preferred embodiments thereof in combination with the attached drawings.

DETAILED DESCRIPTION OF THE PREFERRED EMBODIMENT

Figure 1:
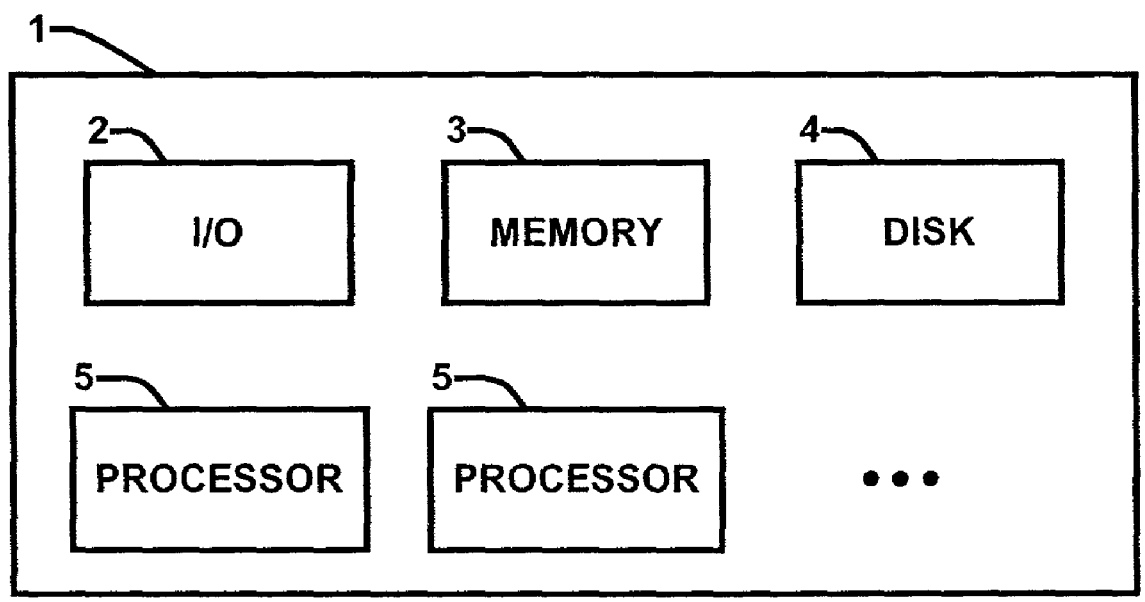
FIG. 1 is a block diagram of a computer having multiple processors on which instructions and data analyzed according to the invention can be executed.

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

Invention described herein can be used in conjunction with invention(s) described in the following application:

Application Ser. No. 09/828,271, filed concurrently with the present application in the name of Vijayan Rajan et al., titled, "Symmetric Multi-Processor Synchronization Using Migrating Scheduling Domains".

This application is hereby incorporated by reference as if fully set forth herein.

Lexicography

Instructions—in general, directives to a processor. Alternatively, steps executable by a processor. Instructions can reference other instructions and data. For example, instructions in the form of function calls reference other instructions that make up the called functions, and functions that act on data reference that data. Instructions can be embodied in various forms, including but not limited to human readable source code, computer readable object code, executable code, and interpretable code.

Data—in general, information in the form of numbers, character, and other values used by instructions.

Function—in general, a set of instructions that perform some task. Also called a process.

Code—in general, instructions and data that make up all or part of a program, function, or other software executable by one or more processors, such as software for a computer.

System Resources—in general, the hardware units of a computer system (e.g., disk drives, memory controllers, network interfaces, etc.)

Code Base—in general, all of the code required to implement a particular program, including code for the program itself and code for interfacing with all functions and system resources used by the program.

Symbols—labels used in code to refer to instructions and data in software. Symbols exist in different forms in any of the various forms in which instructions and data can be embodied. For example, in source code, the symbols typically are words, letters or numbers that refer to particular instructions or data. These symbols typically are converted into numerical addresses or tags when the source code is compile into object code and when the object code is linked to form executable code that can be executed by a processor. Symbols can be private to a function or file, in which case symbols in different functions or files can appear to be identical at the source code level. Despite appearances, these symbols are not identical and do not refer to common instructions, because each symbol inherently includes the identity of the function or file in which it is defined.

Multiprocessor—in general, having more than one processor that operates simultaneously on a set of instructions and data (e.g., a program).

Domains—in general, a grouping of instructions and data. According to the invention, domains are defined based on the symbols used to refer to those instructions and data. Preferably, the domains are defined such that instructions and data executing in separate domains tend not to interfere with each other.

Intra-domain—in general, when an instruction or data in one domain references another instruction or data in that domain.

Inter-domain—in general, when an instruction or data in one domain references an instruction or data in another domain.

Makefile—in general, a file that lists components for a program, for example source code files and library files that are to be compiled and linked so as to create an executable. A makefile also can include special directives and definitions. In the invention, a makefile provides one possible technique for defining domains. Such a makefile preferably comprises a list of domains and a list of files assigned to each domain. Instructions and data referred to by symbols defined by those files are assigned to the domains.

Interference—When execution of two instructions, access to two items of data, or execution of an instruction and access to an item of date results in an improper result because the two operations are unsynchronized. For example, if two sequences of instructions attempt to modify a single item of data simultaneously, the two sequences of instructions are likely to interfere with each other, and one of the modifications is likely to fail. Likewise, if two sequences of instructions attempt to access a single system resource such as a file or network interface simultaneously, the instructions can interfere with each other. Interference is likely to cause execution of instructions and/or access to data to produce incorrect or unpredictable results.

Pseudo-Domain—a special domain that includes instructions and data implemented using appropriate multiprocessor synchronization not to interfere with instructions and data in any other domain. The domain is "pseudo-domain" because no corresponding scheduling domain exists but references from any domain can be considered to be intra-domain as opposed to inter-domain. Equivalently, such references can be considered to be inter-domain references that are unlikely to conflict with other references.

Scheduling-domain-based Symmetric Multiprocessing (SD-SMP)—in general, a scheduling technique for a multiprocessor system in which at most one processor at a time executes an instruction or accesses data from any one domain. This domain-based processor scheduling is explained in more detail in the incorporated disclosure. At a high level, SD-SMP is effectively time division multiple access to multiple processors based on division of instructions and data into domains, with access limited to at most one processor accessing any single domain at a time.

Multiprocessor safe—in general, when an inter-domain reference is deemed to be unlikely to cause interference with another instruction or data reference. Also referred to as "MP-safe" or simple "safe" herein.

Multiprocessor unsafe—in general, when an inter-domain reference is deemed to be likely to cause interference with another instruction or data reference. Also referred to as "MP-unsafe" or simply "unsafe" herein.

Domain conflict—in general, when an instruction or data attempts to refer from one domain to another domain already executing on a processor in a SD-SMP environment, thereby possibly resulting in interference with other instructions or data.

Domain violation—in general, when an instruction or data in one domain improperly references an instruction or data in another domain in a manner that is not multiprocessor safe. A domain violation is synonymous with a "domain conflict".

Annotation—in general, a directive to a compiler, analyzer, linker, checker, code interpreter and/or virtual machine included with a set of instructions or data that is not itself an instruction or data. If the instructions and data form a program that is compiled before execution, the annotation typically is not executed as part of the operation of the program.

Multiprocessing System

FIG. 1 is a block diagram of a computer having multiple processors on which instructions and data analyzed according to the invention can be executed.

Computer system 1 preferably includes input/output 2, memory 3, disk or other mass storage 4, and plural processors 5. Input/output 2 includes, for example, a keyboard, a mouse, a display, a network connection, and the like. Memory 3 stores data and instructions for execution by processors 5. Disk or other mass storage 4 preferably includes a hard drive, floppy disk drive and/or CD-ROM and provides mass storage, for example for files, data, caches, and the like.

In operation, instructions preferably are loaded from disk or other storage 4 or some other source such as a network into memory 3, and processors 5 execute the instructions.

One objective of the invention is to facilitate conversion of instructions and data written for execution on a single processor system into instructions and data that can take advantage of plural processors when run on a system such as computer system 1. To this end, memory 3 preferably stores the instructions and data, along with an analyzer, domain definitions, a checker, and various tables and reports according to the invention.

The instructions and data can be both analyzed and dynamically checked according to the invention on computer system 1. Alternatively, the instructions and data could be analyzed on another computer system, possibly one having only a single processor, and then run on computer system 1. Other variations are possible. Furthermore, computer system 1 is described herein solely for illustrative purposes, and the invention is not limited to systems like computer system 1.

Scheduling-Domain-based Symmetric Multiprocessing

According to the invention, instructions and data are divided into plural domains. Preferably, the entire code base for a system is divided into these domains. The instructions and data preferably are divided into the domains based on the symbols used to reference the instructions and data. This technique is different from known old techniques in which domains are defined based on locations of instructions and data within a particular piece of software.

A simplified example of dividing instructions and data into domains is given below. This example is provided for illustrative purposes only, and the invention is not limited to the specifics of the example.

In the example, assume that a code base for a program includes instructions and data in five files. Further assume that four of the files define symbols and assign functions and data to those symbols, as set forth below:

file A: functions A1, A2, A3; data a1, a2
file B: functions B1, B2, B3, B4; data b1, b2, b3
file C: functions C1, C2; data c1
file D: functions D1, D2, D3, D4

For example, file A could be "disk_io.lib," and function A1 could be "open_file," function A2 could be a "read_file," function A3 could be "close_file," data A1 could be "file_pointer," and data A2 could be "data_pointer." The other files could include instructions defining other functions and data.

Finally, assume that the fifth file, file E, includes executable instructions that use the symbols defined by the other files (e.g., function A1, data C1) to access the various functions and data. Thus, the fifth file will include symbols calling the various functions and accessing the various data defined by the other four files.

To define domains for the instructions and data in the various files, the invention preferably uses a "makefile." This makefile includes a list of domains and a list of files assigned to each domain, whereby instructions and data referred to by symbols defined by those files are assigned to the domains. For example, if the domains are Domains I, II, and III, one possible makefile would be as follows:

DomainI=fileA fileB
DomainII=fileC fileD
DomainIII=fileE

This makefile assigns all instructions and data defined by files A and B to Domain I, all instructions and data defined by files C and D to Domain II, and all instructions and data defined by file E to Domain III. Thus, references to symbols assigned to functions A1, A2, A3, B1, B2, B3 and B4 and data a1, a2, a1, a2, and B3 would be references to instructions and data in Domain I. References to symbols assigned to functions C1, C2, D1, D2, D3 and D4 and data c1 would be references to instructions and data in Domain II. Likewise, references to symbols assigned to functions and data defined in file E would be references to instructions and data in Domain III.

Symbols can be private to a function or file, in which case symbols in different functions or files can appear to be identical at the source code level. Despite appearances, these symbols are not identical and do not refer to common instructions and date, because each symbol inherently includes the identity of the function or file in which it is defined.

When code in file E is run, all instructions and data are considered to be running in Domain III. When those instructions include symbols assigned to functions and data defined in another of the files in a different domain, those symbols are considered to be referencing instructions and data in that domain.

Thus, if file E includes an instruction that references a symbol assigned to function A1 (e.g., an instruction to execute function A1), that instruction would involve an inter-domain reference from Domain III to Domain I, because that symbol is assigned to a function defined in file A in Domain I. Likewise, if file E includes an instruction that operates on the symbol "data C1," that instruction would involve an inter-domain reference from Domain III to Domain II, because that symbol is assigned to data defined in file C in Domain II.

The instructions in file E can involve symbols assigned to functions and data defined in file E. These references would be intra-domain references within Domain III.

In an actual implementation of a code base according to the invention, functions and data in each of the files preferably can include symbols that reference functions and data in other files. Thus, when a function in one file is called from a function in another file, that function in turn can call other functions in other files, possibly resulting in further inter-domain references.

The domain definitions also can be modified by a "switch domain" function in the instructions. For example, a function in file E could include a call to switch to Domain II before another instruction that involves a reference to Domain II. As a result of this switch, the reference would not be an inter-domain reference. File E could then include another switch domain function for switching back to Domain III after the instruction making the reference is completed. Switching domains is explained in more detail below with reference to FIG. 2.

Inter-domain references are of concern because those reference represent points at which execution of the instructions and data switch from one domain to another domain. According to the invention, such switching is important because computer system 1 is configured to use at most one processor at a time to execute an instruction or to access data from any one domain. Any one of plural processors 5 can execute instructions and access data from any domain as long as another one of processors 5 is not already running an instruction or accessing data from that domain. This method of processor scheduling is referred to as scheduling-domain-based symmetric multiprocessing (SD-SMP) and is explained in more detail in the incorporated disclosure.

Briefly, by executing only one instruction at a time from each domain, SD-SMP ensures that instructions within a domain cannot interfere with each other. When instructions cross domains (i.e., make inter-domain references), those instructions can interfere with instructions running simultaneously in other domains. In particular, if an instruction or data makes an inter-domain reference to an instruction or data in a domain that is already being serviced by a processor, that inter-domain reference results in a domain conflict. Domain conflicts can result in interference between instructions running on different processors.

In order to avoid interference that can be caused by domain conflicts, the invention checks inter-domain references to attempt to ensure that they are multiprocessor safe (MP-safe). In general, MP-safe inter-domain references are implemented using synchronization so not to result in domain conflicts and interference between instructions.

Various levels of MP-safety can be defined. At one extreme, instructions and data are considered MP-safe only if interference between instructions and data in conflicting domains is entirely eliminated. At another extreme, instructions and data are considered MP-safe if interference between instructions and data in conflicting domains does not result in catastropic failure.

One or more of the domains for the code base preferably can be designated as an MP-safe pseudo-domain. Instructions that reference symbols defined in a multiprocessor safe pseudo-domain are not considered to be truly inter-domain. Equivalently, these instructions are considered to be always multiprocessor safe inter-domain references. In other words, instructions and data in the MP-safe pseudo-domain are either (1) expected not to interfere with or to be affected by other instructions and data running simultaneously on another processor, or (2) of such a nature that interference with or by those other instructions and data is acceptable.

The division of instructions and data into domains involves design choices. One consideration in making these design choices is what system resources are accessed by the instructions and data. Another consideration is what data is accessed by the instructions—instructions that access common data preferably should be grouped in a single domain so as to avoid interference. Yet another consideration is the functionality of the instructions and functions defined by the instructions. Instructions that perform related functions are likely to interfere if run simultaneously. For example, functions that operate on mass storage are likely to interference with each other if run simultaneously on plural processors. Thus, instructions and data that are related based on functionality should be grouped into a common domain.

Another design choice involves determining which instructions and data to place in the MP-safe pseudo-domain. Preferably, as many instructions (i.e., functions)

and data are placed in the MP-safe pseudo-domain as possible, because those instructions and data are defined as not interfering with any other instructions or data. Thus, the more instructions and data that are placed in the MP-safe pseudo-domain, the more instructions can be executed and data can be accessed simultaneously by multiple processors. However, care must be taken to ensure that the instructions and data in the pseudo-domain do not actually interfere with each other and with instructions and data in the other domains.

Figure 2:
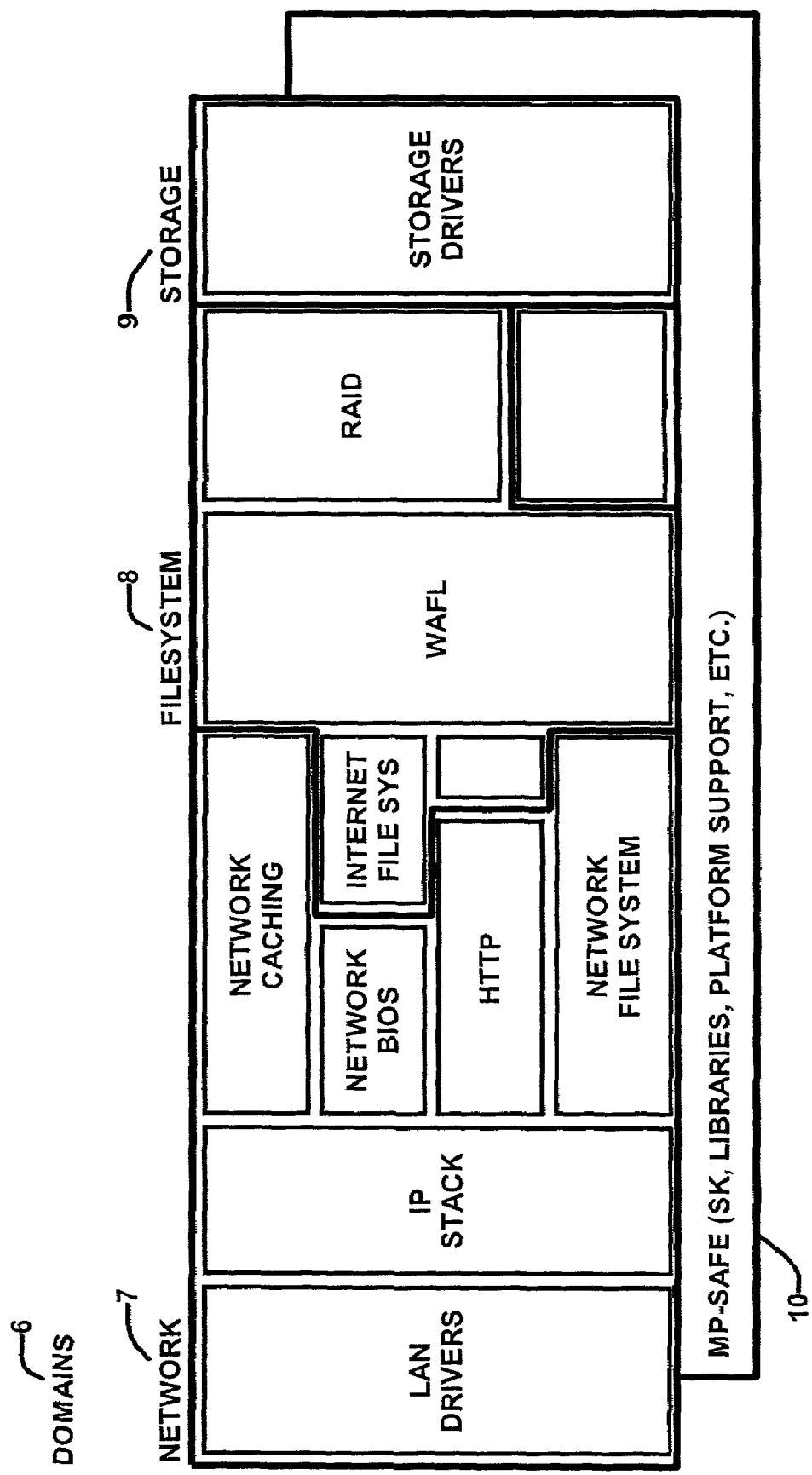
FIG. 2 is a block diagram illustrating division of instructions and data into domains according to one implementation of the invention.

FIG. 2 is a block diagram illustrating division of instructions and data into domains according to one implementation of the invention.

In FIG. 2, instructions (e.g., function calls, mathematical and logical operations, objects, etc.) and data are divided into four domains 6. These domains include network domain 7, filesystem domain 8, storage domain 9, and MP-safe pseudo-domain 10.

Network domain 7 includes network functions and data referred to by the network functions, storage domain 9 includes storage functions and data referred to by the storage functions, and filesystem domain 8 includes functions and data referred to by the filesystem and functions.

In more detail, in one embodiment of the invention, network domain 8 includes LAN drivers, IP stack, network caching code and data (e.g., NetCache™ code and data developed by Network Appliance, Inc.), NetBIOS code and data, hypertext (http) code and data, and network file system code and data. Storage domain 10 includes storage drivers and data. Filesystem domain 8 includes internet file system code and data (e.g., CIFS™ code as implemented by Microsoft Corp., of Redmond, Wash.), Write Anywhere Filesystem Layout (WAFL) code and data, and RAID code and data.

Also shown in FIG. 2 is multiprocessor-safe (MP-safe) pseudo-domain 10 that includes instructions and data for interfaces, libraries and platform support that are implemented so to be safe regardless of when and where they are run.

As discussed above, the particular division of instructions and data into domains involves design choices. Illustratively, in an example embodiment of the invention, the network caching code and data was originally placed by the inventors in filesystem domain 8, then was modified to fit in network domain 7. Thus, the arrangement shown in FIG. 2 is merely one possible division for one possible set of instructions and data. Other divisions are possible and are within the scope of the invention.

Figure 3:
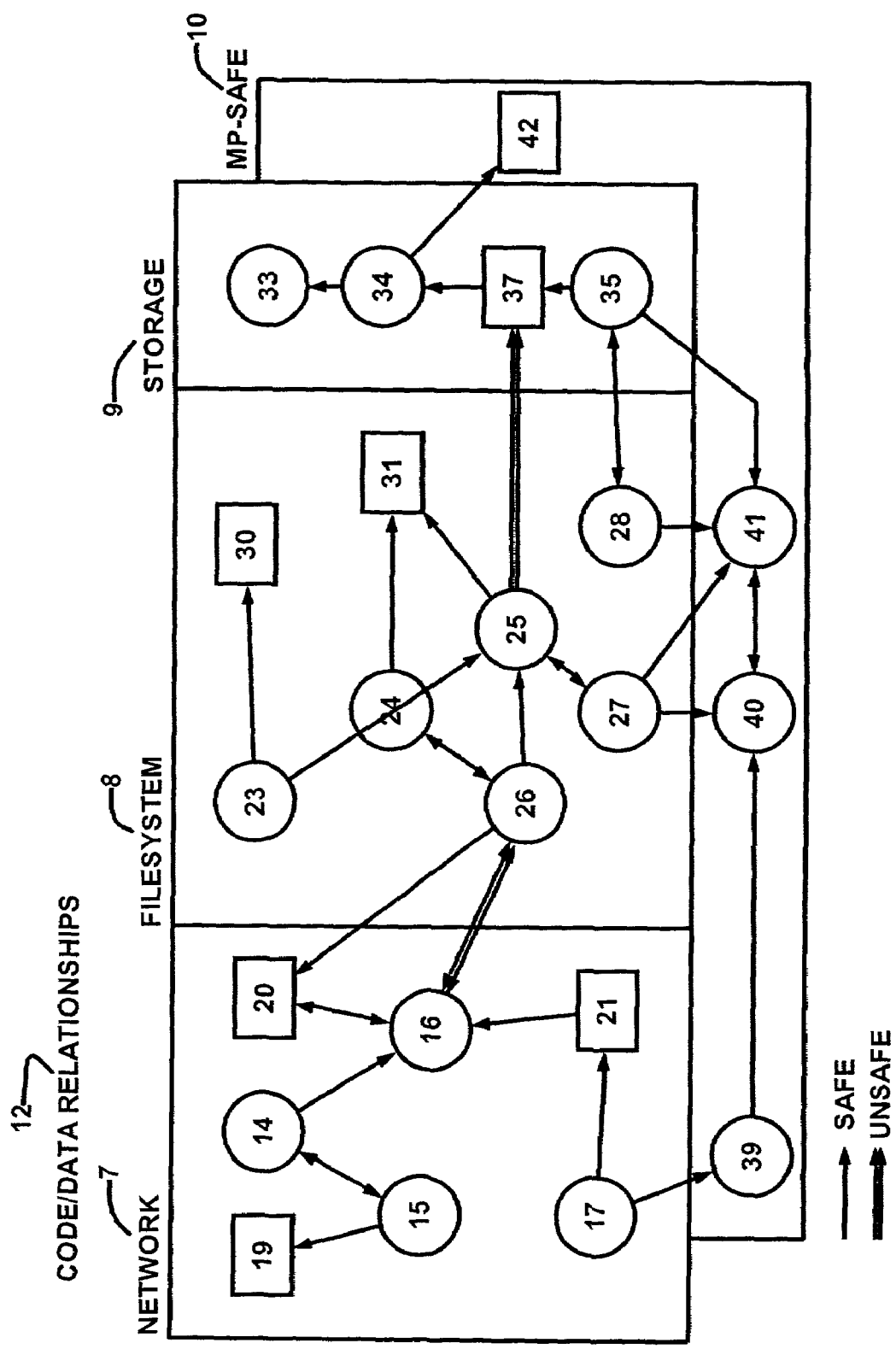
FIG. 3 is a block diagram illustrating safe and unsafe references between instructions and data in different domains according to the invention.

FIG. 3 is a block diagram illustrating safe and unsafe references between instructions and data in different domains according to the invention.

In FIG. 3, circles represent instructions that define functions, and boxes represent data. The functions and data reside in different domains. In particular, functions 14 to 17 and data 19 to 21 are in networks domain 7, functions 23 to 28 and data 30 and 31 are in filesystemdomain 8, and functions 33 to 35 and data 37 are in storage domain 9. Likewise, functions 39 to 41 and data 42 are in MP-safe pseudo-domain 10.

References by instructions in functions to other functions (e.g., function calls) and to data are shown by arrows. Intra-domain references are always safe, as indicated by the single-line arrows representing such references in FIG. 3. All references to, from and within MP-safe pseudo-domain 10 are considered safe. Some inter-domain references also are safe—in particular, if they use the safe services of the pseudo-domain 10, for example message passing. However, some inter-domain references are unsafe. An analyzer according to the invention attempts to determine which references are safe and which are unsafe, as explained in more detail below.

Analyzer

Briefly, an analyzer according to the invention analyzes instructions and data to determine where the instructions and data might result in incorrect results when run on a multiprocessor system. The instructions and data are divided into plural domains based on the symbols used to refer to those instructions and data, and the multiprocessor system is configured to use at most one processor at a time to execute instructions and to access data from any one domain. The analyzer preferably includes a reference analyzer and a report generator. The reference analyzer determines which of the instructions and data involve references outside of their domains, and determines which of the references outside of their domains are multiprocessor unsafe references. The report generator generates a report of the multiprocessor unsafe references. In a preferred embodiment, the analyzer also includes a table generator that generates a table of purportedly safe inter-domain references for use by a checker according to the invention.

Preferably, the analyzer also includes a modifier that modifies the instructions and data based on the report. In one embodiment of the invention, the determining steps, the generating step, and the modifying step are repeated until none of the references are determined to be multiprocessor unsafe references, whereby code originally written for a single processor system is modified to be suitable for use on a multiprocessor system.

Figure 4:
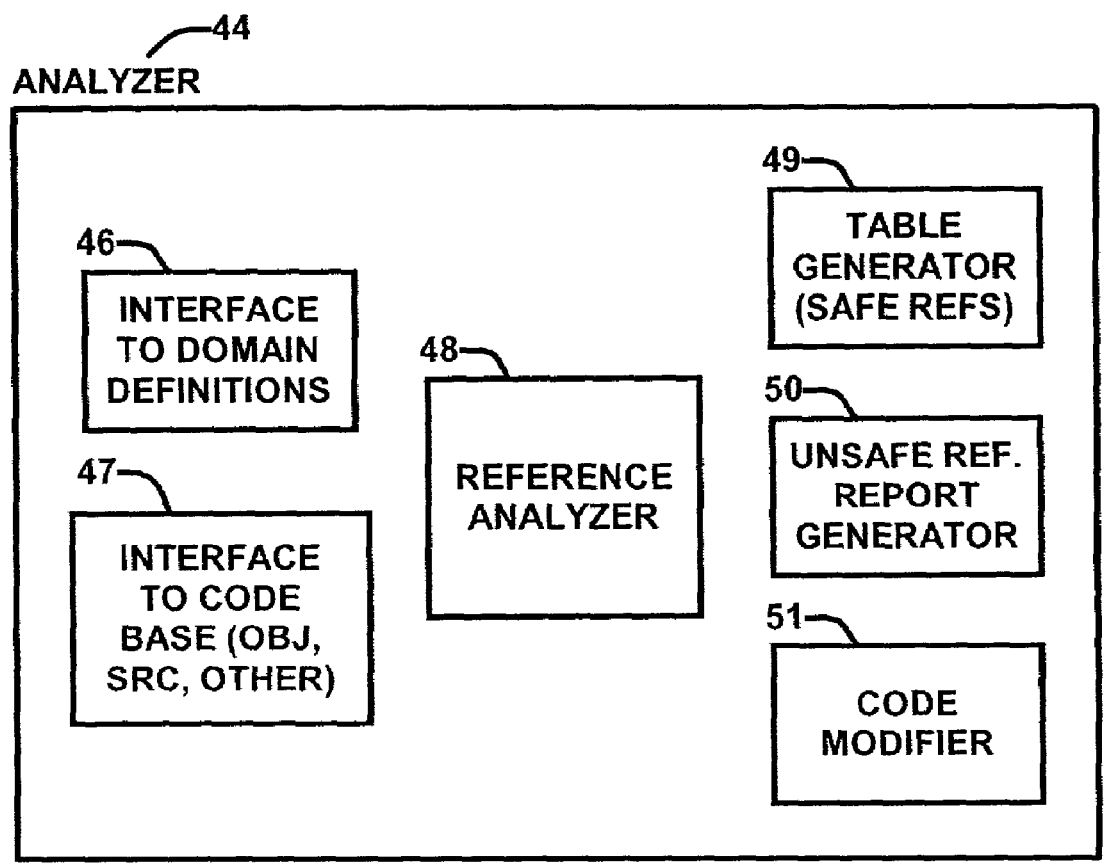
FIG. 4 is a block diagram of an analyzer according to one embodiment of the invention.

FIG. 4 is a block diagram of an analyzer according to one embodiment of the invention.

In FIG. 4, analyzer 44 includes interface 46 to domain definitions, interface 47 to code, reference analyzer 48, table generator 49, unsafe reference report generator 50, and possibly code modifier 51.

Interface 46 to domain definitions preferably is an interface to a makefile that defines domains for instructions and data based on the files that include those instructions and data. The makefile preferably is placed at a common location accessible by analyzer 44. Reference analyzer 48 uses the symbols assigned to the instructions and data (e.g., function names and data names) in the files to determine domains for instructions and data under analysis.

Interface 47 to code preferably is an interface to instructions and data under analysis. Preferably, the instructions and data form a code base for a program. The code base is all of the code require to implement the program, including code for interfacing with system resource. Preferably, all files in the code base are included in the domain assignments in the makefile.

Interface 47 can be to source code, object code, executable code, interpretable code, and/or code for execution by a virtual machine. Additionally, the instructions and data need not be "code" per se; that term is simply used in FIG. 4 for convenience. Non-code instructions, such as resource utilization macros and the like, also can be accessed through interface 47 and analyzed by analyzer 44.

Reference analyzer 48 analyzes references between instructions and data in order to detect purportedly MP-safe and MP-unsafe references, as explained in more detail below with reference to FIG. 5.

Table generator 49 generates a table of purportedly safe inter-domain references. In one possible implementation of the invention, the table of safe inter-domain references is in the form of a C source file. In this implementation, details of each safe symbol reference appear as a C macro invocation. These details should at least include the symbol name, but can be expanded to the filename and line number in which the definition or reference occurs and the annotated reason why this symbol is purportedly safe.

Preferably, the table is compiled into binary form for use by a dynamic checker according to the invention. Use of such a table by a dynamic checker is explained in more detail below in the Checker section of this application.

While table generator 49 is present in a preferred embodiment of the invention, table generator 49 is not necessary for analyzer 44 to function.

Unsafe reference report generator 50 generates a report of unsafe references detected by analyzer 44 in the instructions and data under analysis. Preferably, the report includes a list of inter-domain references that the analysis has shown are multiprocessor unsafe, and for each inter-domain reference, the domains involved in the inter-domain reference.

The report of unsafe references can be "formatted" or "unformatted." In a preferred embodiment, formatted reports are written to a standard output (e.g., "stdout") as text in the following form:

---
<symbol_name><type><domain_def>:<module_def>
    <domain_ref>:<module_ref>
---

The symbol name, type, defining domain, and module preferably are output once for each referenced symbol, followed by lines listing the domain(s) and module(s) making the reference. Multiple references preferably are grouped by domain. The symbol type preferably is a single character abbreviation. Typical values for the symbol type include, but are not limited to, "T" for text, "D" for data, and "C" for common.

Non-formatted reports preferably include lines in the following form for each symbol reference:
<symbol_name><type><domain_def>:
<module_def><domain_ref>:<module_ref>

That is, the name, type, defining domain, and module preferably are listed for every reference.

Code modifier 51 preferably modifies the instructions and data based on the report generated by unsafe reference report generator 50. While code modifier 51 is present in a preferred embodiment of the invention, code modifier 51 is not necessary for analyzer 44 to operate.

The operations of interface 46 to domain definitions, interface 47 to code, reference analyzer 48, table generator 49, unsafe reference report generator 50, and code modifier 51 are explained in more detail below with respect to FIG. 5.

Figure 5:
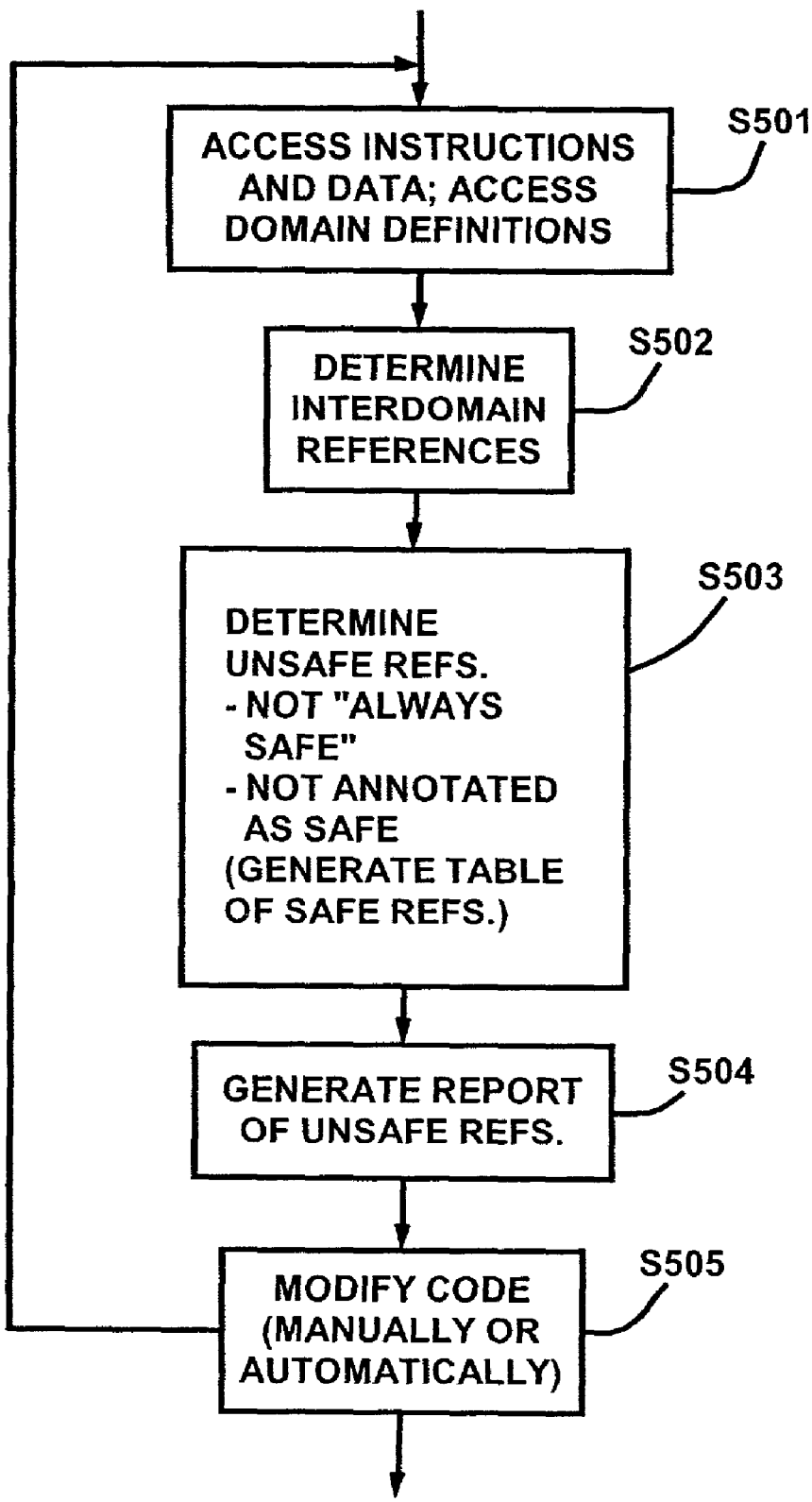
FIG. 5 is a flowchart for explaining operation of an analyzer according to one embodiment of the invention.

FIG. 5 is a flowchart for explaining operation of an analyzer according to one embodiment of the invention.

In the event that analyzer 44 is analyzing source code, that source code preferably is analyzed prior to compilation. If analyzer 44 is operating on object code, that code can be analyzed before or during a linking operation that transforms the object code into executable code. The code also can be interpretable code or code for execution by a virtual machine, in which case analyzer 44 preferably analyzes the code during execution.

In any event, the step S501, reference analyzer 48 of analyzer 44 accesses domain definitions through interface 46 and instructions and data to be analyzed through interface 47.

In step S502, reference analyzer 48 analyzes the instruction and data to determine which of the instructions and data involve references outside of their domains. In a preferred embodiment, the reference analyzer performs this step by first determining from what domains the instructions are operating. For example, an instruction in a function defined in a file assigned to a first domain is operating in that domain. The reference analyzer then determines which of those instructions involve symbols referencing instructions and data in other domains. For example, if an instruction operating in a first domain is a call using a symbol referencing a function defined in a file assigned to a second domain, that instruction involves an inter-domain reference from the first domain to the second domain.

Reference analyzer 48 in step S503 determines which of the references outside of their domains are MP-unsafe and which are considered to be MP-safe. MP-safe references are references that are are unlikely to interfere with other instructions running on another processor. As discussed above, various levels of MP-safety can be defined. At one extreme, instructions and data are considered MP-safe only if interference between instructions and data in conflicting domains is entirely eliminated. At another extreme, instructions and data are considered MP-safe if interference between instructions and data in conflicting domains does not result in catastrophic system failure.

In a preferred embodiment, all intra-domain references and all references to an MP-safe pseudo-domain are considered to be safe, leaving only inter-domain references. Of these inter-domain references, those references annotated in the analyzed code as safe are considered to be safe. All other inter-domain references are considered to be unsafe.

For code that must be complied to be executed, annotations preferably are in the source code. When the source code is compiled, the meaning of the annotations is preserved in the resulting object code. Thus, either the source code or the object code can be analyzed according to the invention. For code that need not be compiled, such as interpretable code and code for execution by a virtual machine, the annotations preferably are directly in the code.

The annotations preferably provide reasons why the inter-domain references are safe. Different annotations preferably are provided for importing, exporting and referencing other code or data. One possible format for the annotations follows:
DOMAIN_IMPORT (symbol, reason)
DOMAIN_EXPORT (symbol, reason)
DOMAIN_REFERENCE (symbol, reason)

In these annotations, "symbol" is the symbol designated by the inter-domain reference.

Annotations preferably are placed both at the referring instruction and at the definition of the referenced symbol. For example, if a function main.c in the filesystem domain calls a function assocaited with the symbol disk_write.c in the storage domain, an annotation preferably would be placed both in main.c at the function call and in disk_write.c, preferably at the start of the function.

In one embodiment of the invention, possible reasons for considering inter-domain references to be safe include the following: MPSAFE, UP_ONLY, INIT, CONSTANT, READONLY, and LAX. MPSAFE indicates that the reference is always safe despite it being an inter-domain reference.

UP_ONLY indicates that the reference only can occur when a single processor is executing code, so interference among plural processors is not possible. INIT indicates that the reference is only used at system initialization which is conducted on a single processor. CONSTANT indicates that the reference is to asymbol has a constant value, and READONLY indicates that the reference is to read-only data and atomic. Constant and read-only data is immune to inter-processor corruption. Finally, LAX indicates that while inter-processor inconsistency is possible, the reference is of such a nature that this is acceptable.

Another possible reason for considering a reference to be safe is that the instruction making the reference is preceded by an instruction to change domains so as to ensure that the reference is an intra-domain reference. Preferably, instructions (e.g., switch_domain) trigger the change of domains and then a change back to the old domain. The instruction to switch domains preferably is annotated with the reason SWITCH_DOMAIN.

An example of code utilizing the SWITCH_DOMAIN in C source code follows:

```
DOMAIN_EXPORT (if_stat, SWITCH_DOMAIN);
void if_stat (int *inp, int *outp)
{
    struct ifnet *ifp;
    domain_t old_domain = switch_domain(domain_network);
    *inp = 0;
    *outp = 0;
    for (ifp = ifnet; ifp; ifp = ifp -> if_next) {
        if (ifp -> if_flags & IFF_PVIF_TRUNK)
            continue;
        *inp += ifp -> if_ibytes;
        *outp += ifp -> if_obytes;
    }
    (void) switch_domain (old_domain);
}
```

Sometimes instructions for a function or data item will be in a library defined as residing in one domain, while the instructions or data more properly belongs in another domain. In the preferred embodiment, those instructions or data can be annotated with the reason DOMAIN_x, where x is the domain to which the instructions or data more properly belong. The DOMAIN_x reason is often used in conjunction with the SWITCH_DOMAIN reason. In particular, a calling reference (e.g., function call) will be annotated with the SWITCH_DOMAIN reason, while the called reference (e.g., function definition) will be annotated with the DOMAIN_x reason. These two annotations allow the code to override the domain definitions set forth in the makefile as necessary.

While the foregoing annotations and reasons are used in a preferred embodiment of the invention, the invention is not limited to these particular annotations and reasons. Other embodiments of the invention are possible that use more, less, some, all or none of the annotations and reasons discussed above.

In a preferred embodiment, table generator 49 of analyzer 44 generates a table of inter-domain references that are annotated as safe. Preferably, the table includes the domains to which the references are supposed to refer. Due to coding errors and other possible reasons, these references may not actually be safe. In other words, when run on a multiprocessor system, these inter-domain references might still result in interference between instructions running in different domains. Therefore, these inter-domain references are only purportedly safe.

In order to help catch unexpected domain violations that might result in actual interference between instructions, a checker according to the invention can be used to check the code at run time. The table of purportedly safe inter-domain references can be used by the run-time checker in detecting domain violations, as explained below with reference to FIGS. 9 and 10.

Returning to FIG. 5, report generator 50 of analyzer 44 in step S504 reports all inter-domain references that are not always safe and that are not annotated as safe. Based on this report, the source code can be modified in step S505 to correct the unsafe references.

Steps S501 through S505 preferably are repeated until all MP-unsafe inter-domain references have been eliminated.

The steps described above with respect to FIG. 5 are applicable to any format of instructions and data (e.g., source code, object code, etc.). However, in a preferred embodiment, the invention analyzes object code prior to linking.

Figure 6:
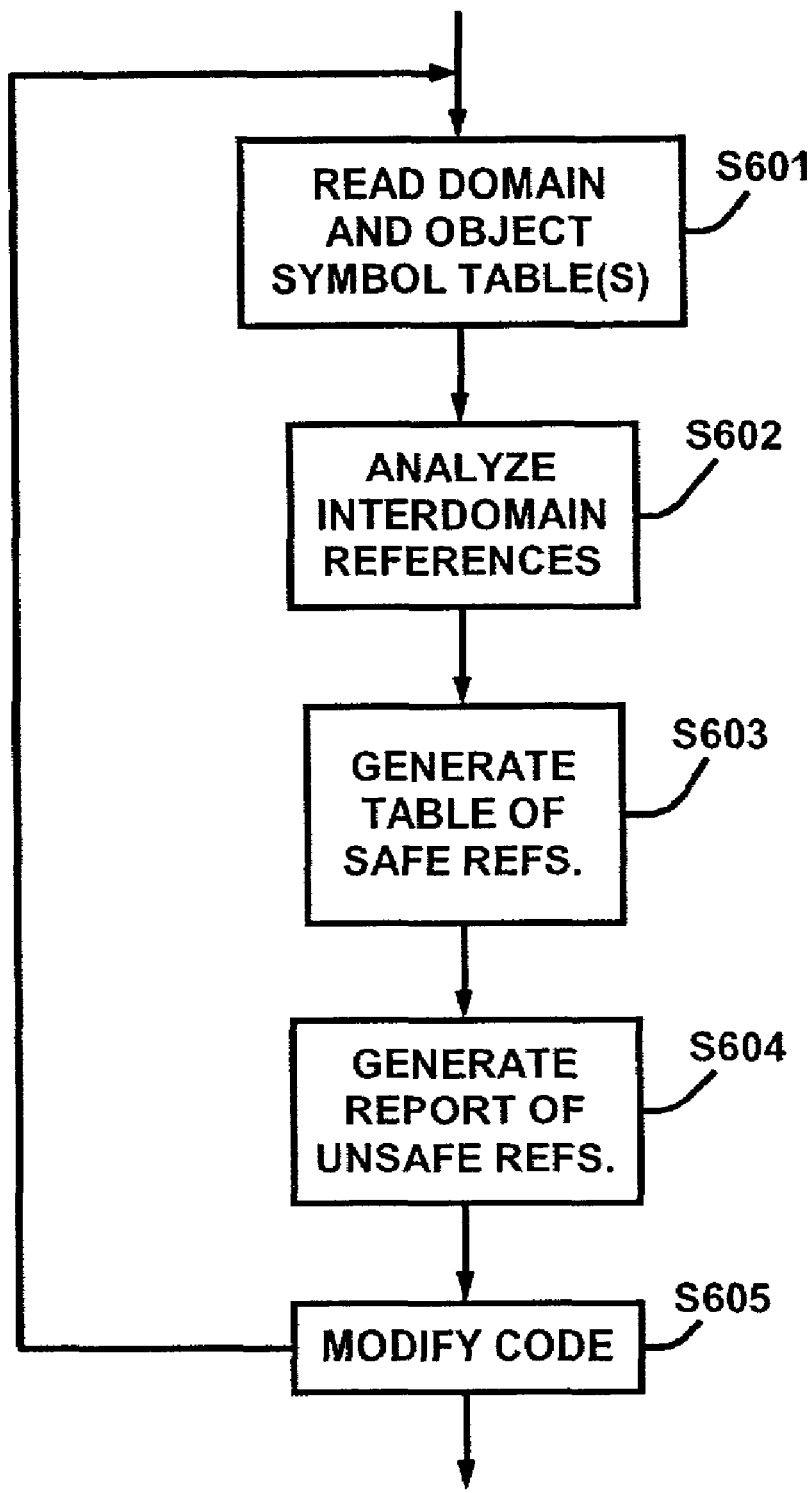
FIG. 6 is a flowchart for explaining operation of an analyzer according to one embodiment of the invention, tailored to analysis of object code.

FIG. 6 is a flowchart for explaining operation of an analyzer according to one embodiment of the invention, tailored to analysis of object code. This object code preferably includes information derived from any annotations in the source code that formed the basis for the object code.

In step S601, analyzer 44 accesses object symbol table(s) for the compiled instructions and data. These object symbol table(s) are generated when source code is compiled. The object symbol tables include all symbols for all references between functions in the code. Analyzer 44 also access the domain definitions, which define domains associated with each symbol.

In step S602, reference analyzer 48 of analyzer 44 compares (i.e., correlates) the domain definitions with the symbols in the object symbol tables. In other words, reference analyzer 48 searches for matches between symbols in the object code and symbols in the domain definitions. Based on these matches, reference analyzer 48 determines all inter-domain references. Reference analyzer 48 can then check for safe and unsafe references by examining the object code associated with each inter-domain reference. As discussed above, this object code preferably includes information derived from any annotations in the associated source code. Thus, safe references can be distinguished from unsafe references based on this derived information.

Preferably, table generator 49 generates a table of purportedly safe inter-domain references in step S603. This table be used by a run time checker, as discussed below with respect to FIGS. 9 and 10.

In step S604, report generator 50 generates a report of unsafe inter-domain references. This report preferably is used by code modifier 51 in step S605 to modify the object code. No linked and runnable code is generated if any unsafe reference exist.

Steps S601 to S605 can be repeated until no unsafe inter-domain references remain. At that point, the object code can be linked, creating an executable that is configured to run properly on a multiprocessing system using course symmetric multiprocessing according to the invention.

In the method explained above with respect to FIG. 6, the analyzer uses an object symbol table created by compiling source code. The correlation of symbols in this table with domain definitions is very similar to the correlation of symbols involved in linking object code compiled from the source code. Accordingly, the analyzer can be incorporated into a linker, allowing the analyzer and the linker to share the task of correlating symbols.

Figure 7:
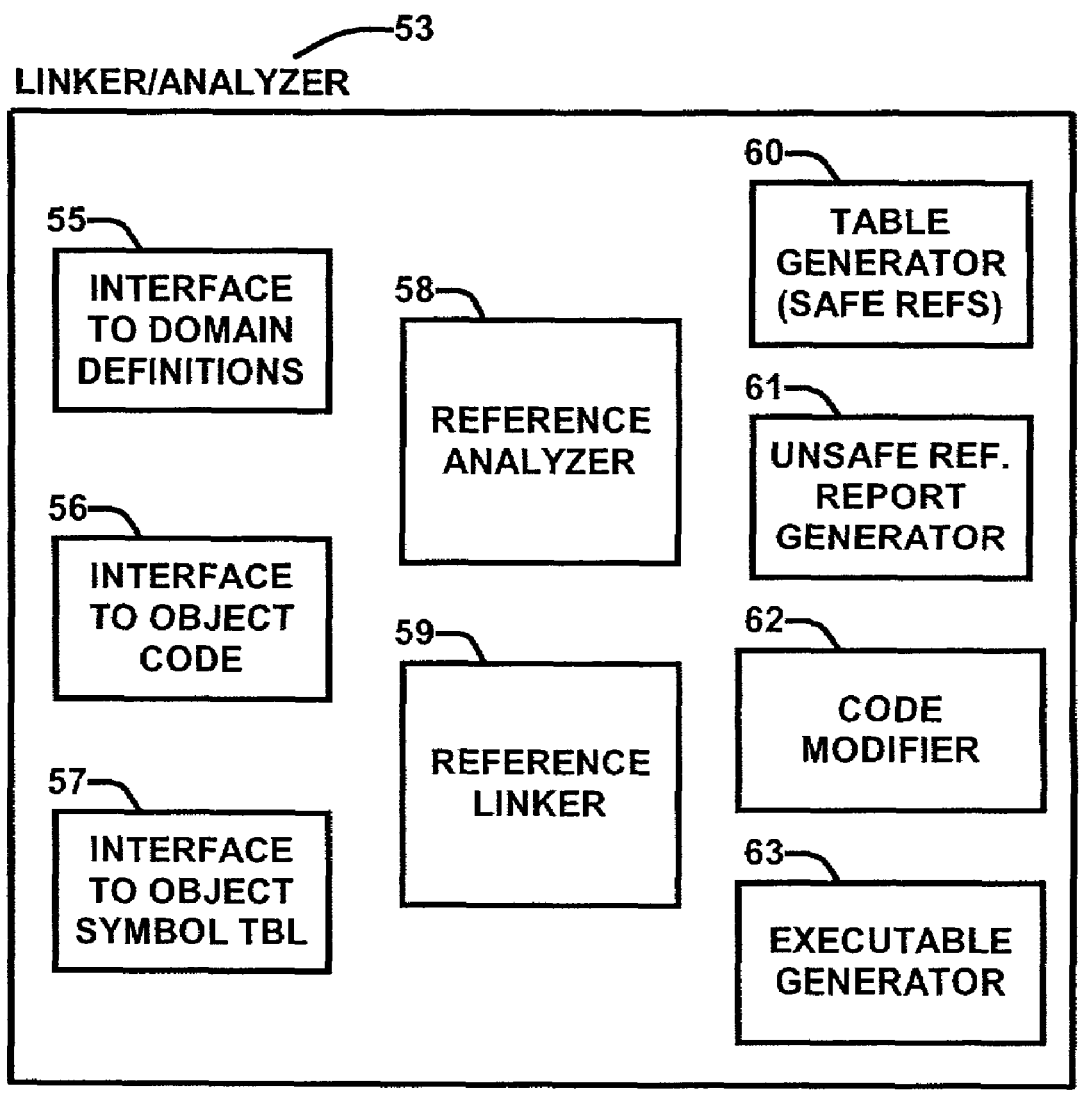
FIG. 7 is a block diagram of a linker/analyzer according to one embodiment of the invention.

Accordingly, FIG. 7 is a block diagram of a linker/analyzer according to one embodiment of the invention.

Linker/analyzer 53 includes interface 55 to domain definitions, interface 56 to object code, interface 57 to an object symbol table, reference analyzer 58, reference linker 59, table generator 60, unsafe reference report generator 61, possibly code modifier 62, and executable generator 63.

Interface 55 to domain definitions preferably is an interface to a makefile that defines domains for instructions and data based on the files that include those instructions and data. The makefile preferably is placed at a common location accessible by linker/analyzer 53. Reference analyzer 58 uses the symbols assigned to the instructions and data (e.g., function names and data names) to determine domains for instructions and data under analysis.

Interface 56 to code preferably is an interface to instructions and data under analysis. In this embodiment of the invention, the instructions and data are in the form of object code. This object code preferably includes information derived from any annotations in the source code that formed the basis for the object code.

Interface 57 to object symbol table is an interface to a table of symbols in the object code. This table preferably is generated when the base source code is compiled. The symbol table is used in analysis of inter-domain references by reference analyzer 58 according to the invention, as well as in linking of references between functions in the object code by reference linker 59.

Table generator 60 generates a table of purportedly safe references. This table is used by a dynamic checker according to the invention, as explained in more detail below in the Checker section of this application. While table generator 60 is present in a preferred embodiment of the invention, table generator 60 is not necessary for analyzer 53 to function.

Unsafe reference report generator 61 generates a report of unsafe references detected by linker/analyzer 53 in the object code under analysis. Preferably, the report includes a list of inter-domain references that the analysis has shown are multiprocessor unsafe, and for each inter-domain reference, the domains involved in the inter-domain reference.

Code modifier 62 preferably modifies the object code based on the report generated by unsafe reference report generator 61. While code modifier 62 is present in a preferred embodiment of the invention, code modifier 62 is not necessary for linker/analyzer 53 to operate. However, without code modifier 62, the linked code output by linker/analyzer 53 may not run properly in a course symmetric multiprocessing environment.

The operations of interface 55 to domain definitions, interface 56 to object code, interface 57 to an object symbol table, reference analyzer 58, reference linker 59, table generator 60, unsafe reference report generator 61, code modifier 62, and executable generator 63 are explained below with reference to FIG. 8.

Figure 8:
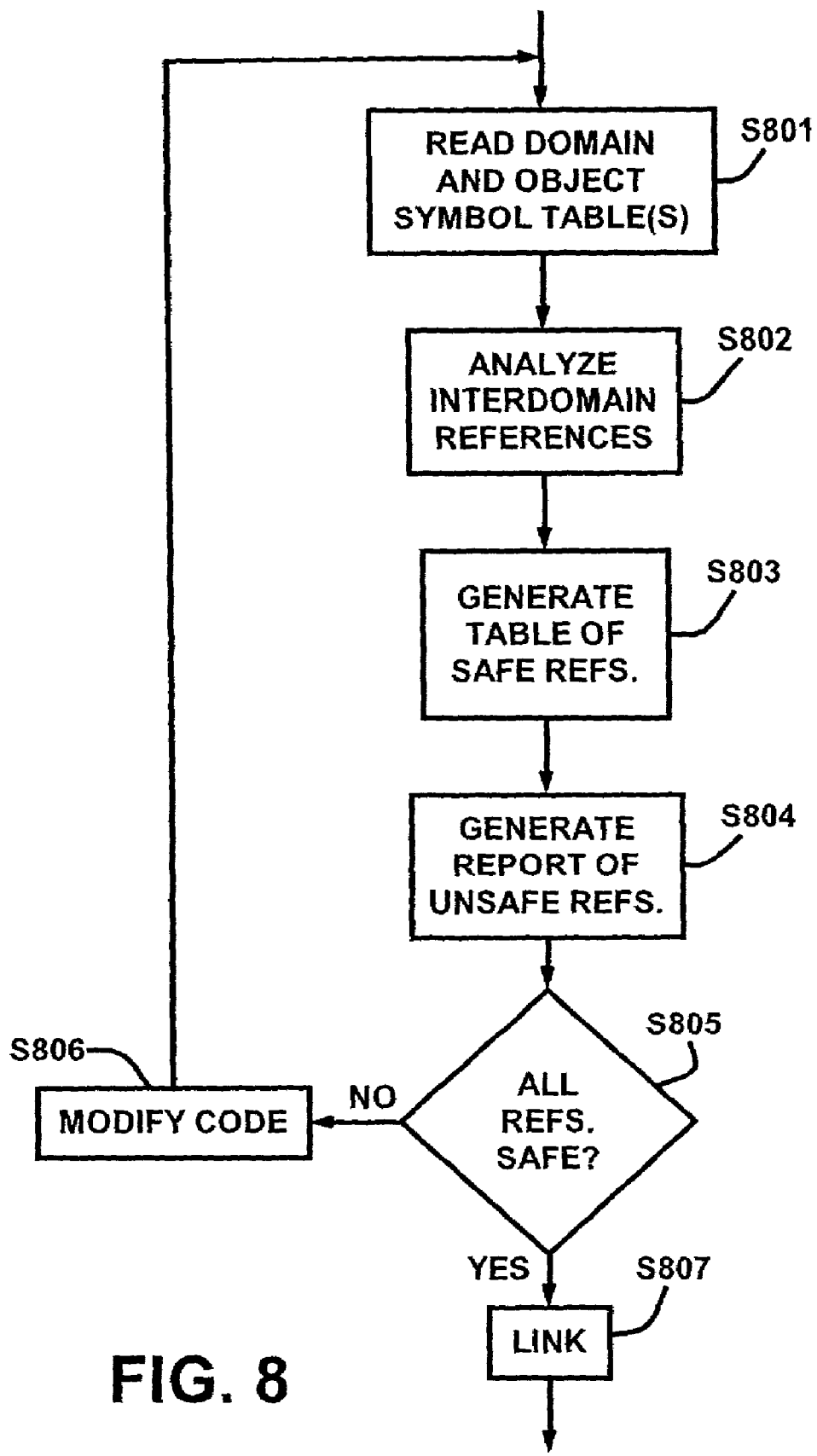
FIG. 8 is a flowchart for explaining operation of a linker/analyzer according to one embodiment of the invention.

FIG. 8 is a flowchart for explaining operation of a linker/analyzer according to one embodiment of the invention.

In FIG. 8, steps S801 through S804 are identical to steps S601 through S604 in FIG. 6, except applied to linker/analyzer 53. Accordingly, a separate discussion of these steps is omitted to avoid unduly obscuring the invention.

In step S805, linker/analyzer 53 examines the report generated by report generator 61 and determines if any unsafe references remain in the object code. If unsafe references remain, flow proceeds to step S806, where the code is modified.

Once all references are analyzed as safe (i.e., intra-domain or safe inter-domain), flow proceeds to step S807, where linker/analyzer links the object code so as to create an executable program.

In an alternative embodiment, steps S805 and S806 are omitted, and the object code is linked in step S807 regardless of unsafe references. Then, the report of unsafe references can be examined so as to determine if the executable is MP-safe within a desired level of safety.

Checker

Briefly, a checker according to the invention dynamically determines where instructions and data result in domain violations when run on a multiprocessor system. The instructions and data are divided into plural domains based on the symbols used to refer to those instructions and data, and the multiprocessor system is configured to use at most one processor at a time to execute instructions and to access data from any one domain. The checker includes an interface to a table of purportedly microprocessor safe references by the instructions and data outside of their domains. The table preferably includes the domains to which the references are supposed to refer. The checker also includes a reference tracker that tracks references made by the instructions and data, and a comparator that determines, when a reference in the table of purportedly microprocessor safe references is encountered during execution of the instructions and data, if the reference is actually to a domain to which that reference is supposed to refer.

Preferably, if the checker determines that a reference is not to a domain to which the table indicates that reference is supposed to refer, the checker halts execution of the instructions and data. Alternatively, the checker includes a modifier that can modify the instructions or data making the improper domain reference. Then, once the reference has been corrected, the instruction or data can be re-executed.

The checker can be implemented as a function in the executable that is being checked. Alternatively, the checker can be implemented in a similar manner as a debugger, namely as a separate executable that runs concurrently with the executable being checked. Other approaches are possible.

Figure 9:
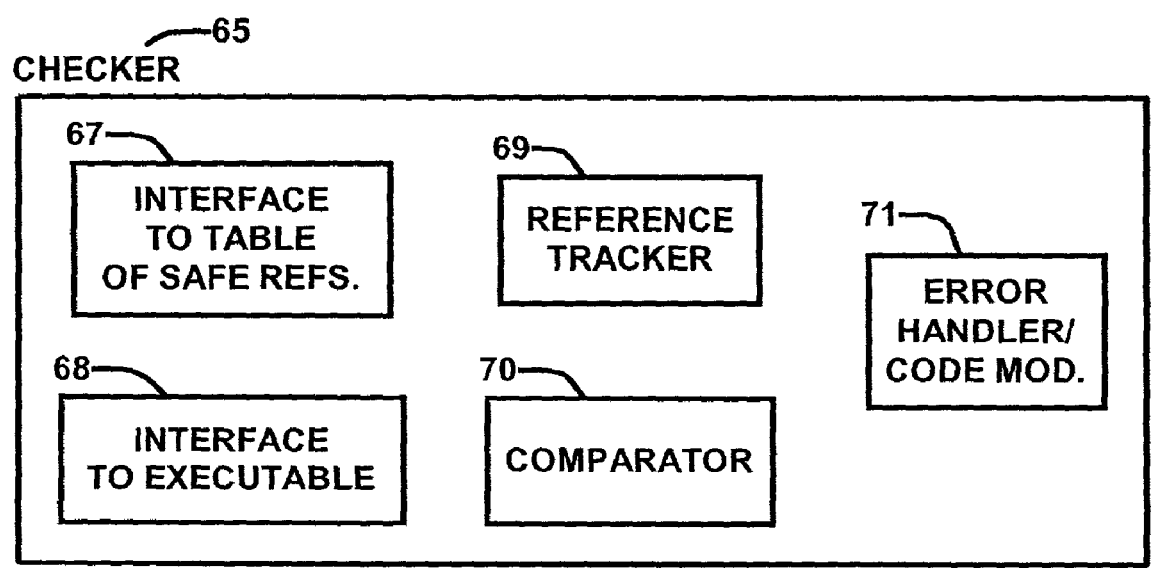
FIG. 9 is a block diagram of a checker according to one embodiment of the invention.

FIG. 9 is a block diagram of a checker according to one embodiment of the invention.

In FIG. 9, checker 65 includes interface 67 to a table or purportedly safe references, interface 68 to an executable, reference tracker 69, domain comparator 70, and error handler/code modifier 71.

Interface 67 is to a table of purportedly safe inter-domain references, preferably in binary form. This table preferably is generated by an analyzer according to the invention, as discussed above. In the preferred embodiment, the table includes a list of safe inter-domain references and the domains involved in each reference. Alternatively, the table can include a list of all intra-domain and inter-domain references and the domains involved in each reference. Other formats for the table are possible.

Interface 68 is to an executable that is to be checked. In one embodiment, this executable is a file that results from linking object code modules. In other embodiments, the executable can be interpretable code or code for execution by a virtual machine. Other type of executables can be interfaced by interface 68 and checked by checker 65. Thus, the term "executable" broadly encompasses any instructions and data that can be executed.

Reference tracker 69 tracks the domains involved in references during execution of the executable. Comparator 70 compares the tracked domains with the domains set forth in the table of purportedly safe references.

Error handler/code modifier 71 is invoked if comparator 70 indicates the actual domain(s) involved in a reference are different from the domains set forth in the table of purportedly safe references. The error handler can take appropriate corrective action, as explained below.

Figure 10:
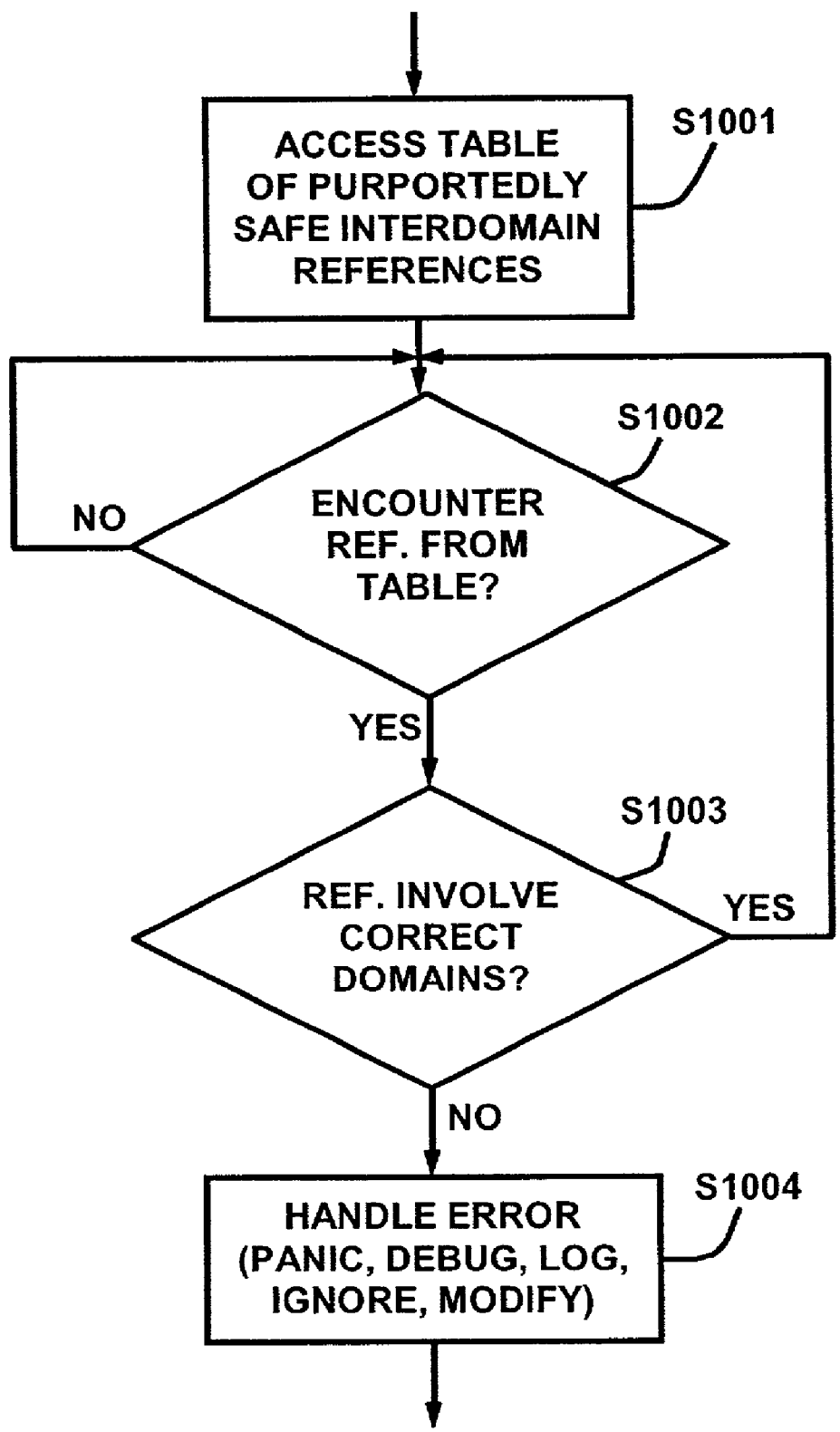
FIG. 10 is a flowchart for explaining operation of a checker according to one embodiment of the invention.

FIG. 10 is a flowchart for explaining operation of a checker according to one embodiment of the invention. The steps shown in FIG. 10 preferably are executed during runtime of the executable being checked.

In step S1001, checker 46 accesses a table of purportedly safe references through interface 67. This table preferably is generated by an analyzer according to the invention, as discussed above. Thus, the analyzer and the checker preferably work together according to the invention.

Reference tracker 69 of checker 65 determines in step S1002 when a reference from the table is encountered by the running executable. Upon detection of such a reference, flow proceeds to step S1003.

In step S1003, reference tracker 69 determines what domain(s) are involved in the encountered reference. Then, comparator 70 compares this domain information with the domains that are supposed to be involved in the reference, as set forth in the table of purportedly safe references. If the domain information matches, little potential probably exists for domain conflicts (i.e., interference between instructions in different domains), and flow returns to step S1002. However, if the domain information does not match, potential likely exists for domain conflicts and interference between instructions, and flow proceeds to step S1004.

Error handler/code modifier 71 of checker 65 takes appropriate corrective measures in step S1004. Examples of appropriate action include halting execution of the code and generating an error message. Other possible actions include, but are not limited to, panicking (i.e., forcing a crash), invoking a debugger such as the Gnu debugger, reporting the domain mismatch to a log and continuing execution of the code, and ignoring the violation.

Combined System

Figure 11:
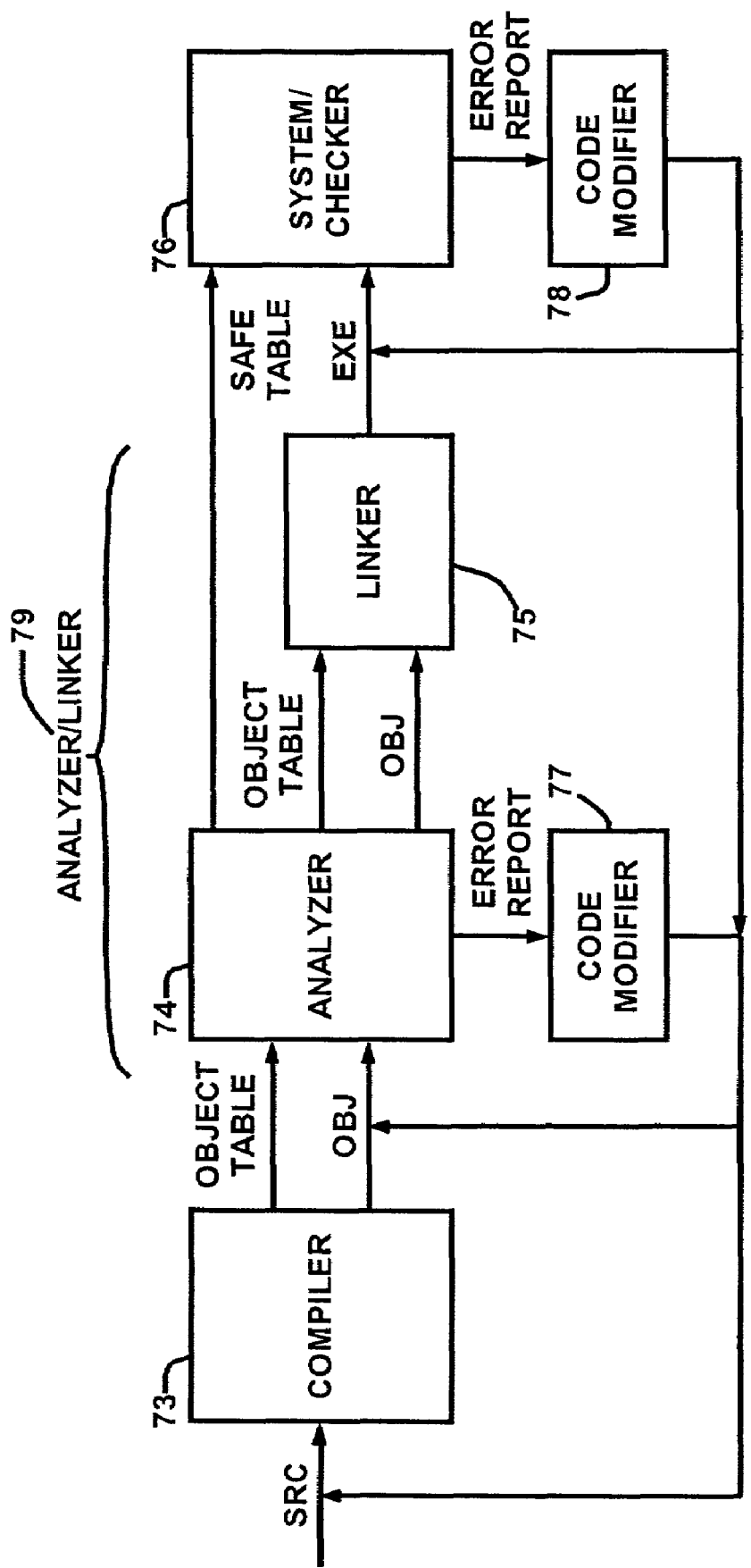
FIG. 11 is a block diagram of a system that compiles, analyzes, links, possibly modifies, executes and dynamically checks instructions and data according to one embodiment of the invention.

FIG. 11 is a block diagram of a system that compiles, analyzes, links, possibly modifies, executes and dynamically checks instructions and data according to one embodiment of the invention.

In FIG. 11, source code is input to the system, the source code is analyzed and linked, and the resulting executable is executed. During these operations, the instructions and data in the code preferably are modified as necessary for execution on a coarse symmetric multiprocessing system.

Thus, the system in FIG. 11 includes compiler 73, analyzer 74, linker 75, system/checker 76, and code modifiers 77 and 78. In an alternative embodiment, linker 74 and analyzer 75 are combined into linker/analyzer 79. The operation of each of these elements has been discussed above. Accordingly, only the interactions between the elements is discussed below.

Compiler 73 accepts source code as an input and generates an object symbol table and object code as outputs.

The object code is analyzed by analyzer 74. The analyzer preferably uses the object symbol table in this analysis. The analyzer preferable generates an "error report" of unsafe inter-domain references. This report can be fed to code modifier 77, which preferably modifies the object code (or possibly the source code) to eliminate the unsafe references. Preferably, this operation is repeated until all unsafe references are eliminated. Then, the object code and object symbol table are passed to linker 75 for linking. In addition, a table of purportedly safe inter-domain references is passed to system/checker 76.

Linker 75 links the object code into an executable based on the symbol definitions in the object symbol table. This executable is passed to system/checker 76 for execution and dynamic verification of coarse symmetric multiprocessing. System/checker 76 performs this dynamic verification based on information from the table of purportedly safe references generated by analyzer 74.

If any improper inter-domain references are detected, system/checker 76 preferably informs code modifier 78, which then modifies the source, object, or executable code as appropriate.

The foregoing system can effectively take source code written for a single processor system as an input, and generate an executable suitable for efficient processing by a coarse symmetric multiprocessing system as an output.

General Application

While the invention is discussed above in terms of a multi-processor system, the invention is equally applicable to any system in which plural resources of a particular type can interfere with each other when running or operating simultaneously. For example, the invention is applicable to analyzing and checking code for using multiple network interfaces or multiple interfaces to storage devices.

Figure 12:
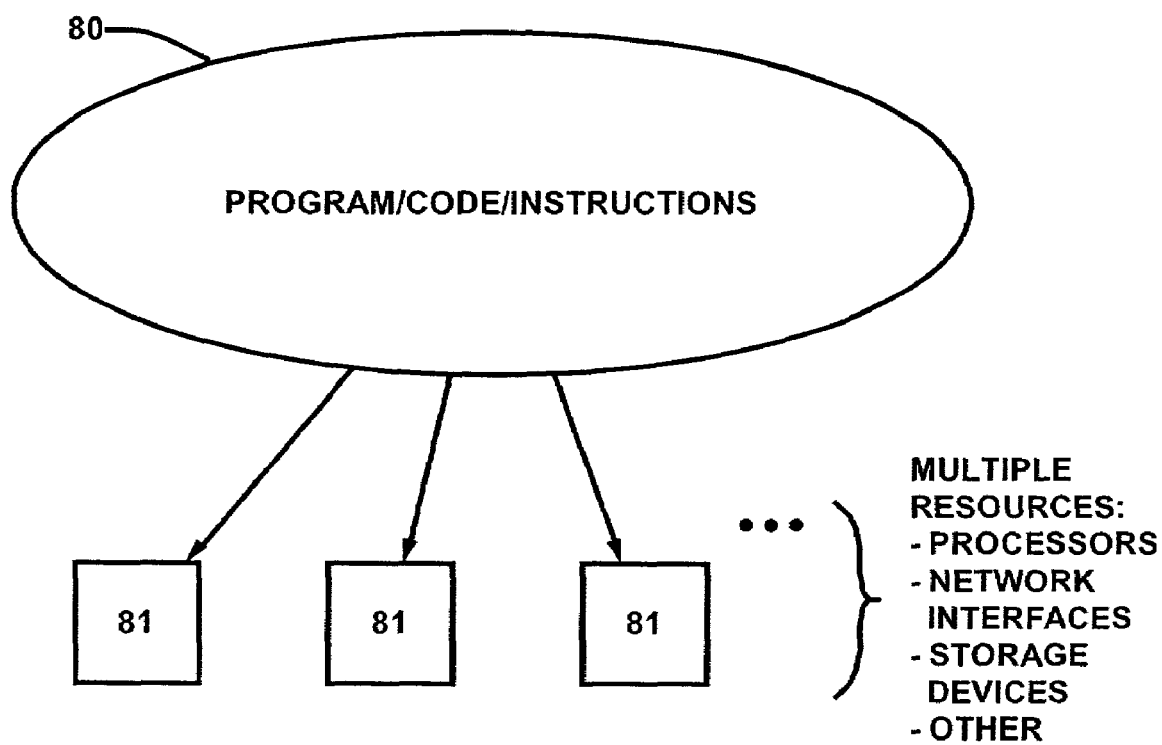
FIG. 12 is a block diagram illustrating a more generalized application of the invention to any situation in which multiple limited resources are shared by instructions and data.

FIG. 12 shows a system to which the more general embodiment of the invention is applicable. In FIG. 12, instructions 80, for example source code, object code, executables, or other forms of programs, utilize plural resources 81 in parallel. Resources 81 are of a type that can be used concurrently by instructions 80. Examples of such resources include, but are not limited to, network interfaces, storage devices, and of course processors.

Simultaneous use of these resources through domain definition and scheduling is advantageous. The analysis and run time checking techniques of the invention can help implement simultaneous utilization of resources 81, even if instructions 80 are originally design for use of just one of the resources.

Thus, a more general embodiment of the invention analyzes instructions and data and dynamically determines where the instructions and data might result in domain violations when run on a system having multiple resources of a type used concurrently. In the system, the instructions and data are divided into plural domains, and the system is configured to use at most one of the multiple resources at a time to execute instructions and to access data from any one domain. The more general embodiment determines which instructions and data make references outside of their domains. This embodiment determines which of the references are unsafe references, and it reports the unsafe references. This more generalized embodiment also can generate a table of purportedly safe references and the domains to which those references are directed. The table can be used to verify that the references actually refer to the proper domains during execution of the instructions and data.

Scope of Invention

Although preferred embodiments are disclosed herein, many variations are possible which remain within the concept, scope, and spirit of the invention, and these variations would become clear to those skilled in the art after perusal of this application without further invention or undue experimentation.

The invention claimed is:

1. A method of analyzing instructions and data for a program to determine where the instructions and data might result in incorrect results when run on a multiprocessor system, the method comprising the steps of:

dividing the instructions and data for the program into plural domains based on symbols used to refer to those instructions and data, the multiprocessor system configured to use at most one processor at a time to execute instructions and to access data from any one domain;

determining which of the instructions and data involve references outside of their domains;

determining which of the references outside of their domains are multiprocessor unsafe references;

generating a report of the multiprocessor unsafe references; and modifying the instructions and data based on the report.

2. A method as in claim 1, wherein the instructions and data comprise code that prior to modification is designed for use on a single processor system.

3. A method as in claim 1, wherein the determining steps, the generating step, and the modifying step are repeated until none of the references are determined to be multiprocessor unsafe references, whereby the code is modified to be suitable for use on a multiprocessor system.

4. A method as in claim 1, wherein the instructions and data comprise source code that is analyzed before compilation.

5. A method as in claim 1, wherein the instructions and data comprise object code that is analyzed before being linked to form an executable.

6. A method as in claim 1, wherein the instructions and data comprise object code that is analyzed while being linked to form an executable.

7. A method as in claim 1, wherein the instructions and data comprise interpretable code that is analyzed at run time.

8. A method as in claim 1, wherein the instructions and data are for execution by a virtual machine, and wherein the instructions and data are analyzed by the virtual machine at run time.

9. A method as in claim 1, wherein the plural domains include a network domain comprising network functions and data referred to by the network functions, a storage domain comprising storage functions and data referred to by the storage functions, and a filesystem domain comprising other functions and data referred to by the other functions.

10. A method as in claim 9, wherein the plural domains further comprise a multiprocessor safe domain, and wherein instructions and data that involve references to the multiprocessor safe domain are considered to be multiprocessor safe references.

11. A method as in claim 1, wherein the step of determining which of the references are multiprocessor unsafe further comprises determining which of the references are neither determined to be always multiprocessor safe nor annotated in the code as multiprocessor safe.

12. A method as in claim 11, wherein references can be annotated in the code as multiprocessor safe because the references switch domains at run time.

13. A method as in claim 1, wherein the instructions and data are modified by adding annotations that indicate references outside of their domains are multiprocessor safe.

14. A method as in claim 1, wherein the instructions and data are modified by adding switch domain functions to the instructions and data to change multiprocessor unsafe references outside of a domain into multiprocessor safe references inside the domain.

15. A method as in claim 1, wherein the instructions and data are modified automatically based on the report of the multiprocessor unsafe references.

16. A method as in claim 1, wherein the instructions and data are modified by an expert system aided by a user.

17. A method as in claim 1, further comprising the steps of:

determining which of the references outside of their domains are purportedly multiprocessor safe references; and generating a table of the purportedly multiprocessor safe references, the table including the domains to which the references are supposed to refer.

18. A memory storing information including first instructions executable by a processor to perform steps to analyze second instructions and data for a program to determine where the second instructions and data might result in incorrect results when run on a multiprocessor system, the steps comprising:

dividing the second instructions and data for the program into plural domains based on symbols used to refer to the second instructions and data, the multiprocessor system configured to use at most one processor at a time to execute instructions and to access data from any one domain;

determining which of the second instructions and data involve references outside of their domains;

determining which of the references outside of their domains are multiprocessor unsafe references;

generating a report of the multiprocessor unsafe references; and modifying the second instructions and data based on the report.

19. A memory as in claim 18, wherein the second instructions and data comprise code that prior to modification is designed for use on a single processor system.

20. A memory as in claim 18, wherein the determining steps, the generating step, and the modifying step are repeated until none of the references are determined to be multiprocessor unsafe references, whereby the code is modified to be suitable for use on a multiprocessor system.

21. A memory as in claim 18, wherein the second instructions and data comprise source code that is analyzed before compilation.

22. A memory as in claim 18, wherein the second instructions and data comprise object code that is analyzed before being linked to form an executable.

23. A memory as in claim 18, wherein the second instructions and data comprise object code that is analyzed while being linked to form an executable.

24. A memory as in claim 18, wherein the second instructions and data comprise interpretable code that is analyzed at run time.

25. A memory as in claim 18, wherein the second instructions and data are for execution by a virtual machine, and wherein the second instructions and data are analyzed by the virtual machine at run time.

26. A memory as in claim 18, wherein the plural domains include a network domain comprising network functions and data referred to by the network functions, a storage domain comprising storage functions and data referred to by the storage functions, and a general domain comprising other functions and data referred to by the other functions.

27. A memory as in claim 26, wherein the plural domains further comprise a multiprocessor safe domain, and wherein instructions and data that involve references to the multiprocessor safe domain are considered to be multiprocessor safe references.

28. A memory as in claim 18, wherein the step of determining which of the references are multiprocessor unsafe further comprises determining which of the references and neither determined to be always multiprocessor safe nor annotated in the code as multiprocessor safe.

29. A memory as in claim 28, wherein references can be annotated in the code as multiprocessor safe because the references switch domains at run time.

30. A memory as in claim 18, wherein the second instructions and data are modified by adding annotations that indicate references outside of their domains are multiprocessor safe.

31. A memory as in claim 18, wherein the second instructions and data are modified by adding switch domain functions to the second instructions and data to change multiprocessor unsafe references outside of a domain into multiprocessor safe references inside the domain.

32. A memory as in claim 18, wherein the second instructions and data are modified automatically based on the report of the multiprocessor unsafe references.

33. A memory as in claim 18, wherein the second instructions and data are modified by an expert system aided by a user.

34. A memory as in claim 18, wherein the steps further comprise the steps of:
determining which of the references outside of their domains are purportedly multiprocessor safe references; and
generating a table of the purportedly multiprocessor safe references, the table including the domains to which the references are supposed to refer.

35. A memory as in claim 18, wherein the memory is a removable storage medium, fixed disk, RAM or ROM.

36. A computer system comprising a processor and an analyzer to cause the processor to analyze instructions and data form a program to determine where the instructions and data might result in incorrect results when run on a multiprocessor system, the analyzer including:
a reference analyzer that divides the instructions and data for the program into plural domains based on symbols used to refer to those instructions and data, the multiprocessor system configured to use at most one processor at a time to execute instructions and to access data from any one domain, that determines which of the instructions and data involve references outside of their domains, and that determines which of the references outside of their domains are multiprocessor unsafe references; and
a report generator that generates a report of the multiprocessor unsafe references.

37. A computer system as in claim 36, wherein the analyzer further includes a modifier that modifies the instructions and data based on the report.

38. A computer system as in claim 37, wherein the instructions and data comprise code that prior to modification is designed for use on a single processor system.

39. A computer system as in claim 37, wherein the determining steps, the generating step, and the modifying step are repeated until none of the references are determined to be multiprocessor unsafe references, whereby the code is modified to be suitable for use on a multiprocessor system.

40. A computer system as in claim 37, wherein the instructions and data comprise source code that is analyzed before compilation.

41. A computer system as in claim 37, wherein the instructions and data comprise object code that is analyzed before being linked to form an executable.

42. A computer system as in claim 37, wherein the instructions and data comprise object code that is analyzed while being linked to form an executable.

43. A computer system as in claim 37, wherein the instructions and data comprise interpretable code that is analyzed at run time.

44. A computer system as in claim 37, wherein the instructions and data are for execution by a virtual machine, and wherein the instructions and data are analyzed by the virtual machine at run time.

45. A computer system as in claim 37, wherein the plural domains include a network domain comprising network functions and data referred to by the network functions, a storage domain comprising storage functions and data referred to by the storage functions, and a filesystem domain comprising other functions and data referred to by the other functions.

46. A computer system as in claim 45, wherein the plural domains further comprise a multiprocessor safe domain, and wherein instructions and data that involve references to the multiprocessor safe domain are considered to be multiprocessor safe references.

47. A computer system as in claim 37, wherein determining which of the references are multiprocessor unsafe further comprises determining which of the references are neither determined to be always multiprocessor safe nor annotated in the code as multiprocessor safe.

48. A computer system as in claim 47, wherein references can be annotated in the code as multiprocessor safe because the references switch domains at run time.

49. A computer system as in claim 37, wherein the instructions and data are modified by adding annotations that indicate references outside of their domains are multiprocessor safe.

50. A computer system as in claim 37, wherein the instructions and data are modified by adding switch domain functions to the instructions and data to change multiprocessor unsafe references outside of a domain into multiprocessor safe references inside the domain.

51. A computer system as in claim 37, wherein the instructions and data are modified automatically based on the report of the multiprocessor unsafe references.

52. A computer system as in claim 37, wherein the instructions and data are modified by an expert system aided by a user.

53. A computer system as in claim 37, wherein the reference analyzer further determines which of the references outside of their domains are purportedly multiprocessor safe references; and wherein the analyzer further comprises a table generator that generates a table of the purportedly multiprocessor safe references, the table including the domains to which the references are supposed to refer.

54. A method of analyzing instructions and data and dynamically determining where the instructions and data for a program might result in incorrect results when run on a multiprocessor system, the method comprising the steps of:
dividing the instructions and data for the program into plural domains based on symbols used to refer to those instructions and data, the multiprocessor system configured to use at most one processor at a time to execute instructions and to access data from any one domain;

determining which of the instructions and data involve references outside of their domains;

determining which of the references outside of their domains are purportedly multiprocessor safe references;

generating a table of the purportedly multiprocessor safe references, the table including the domains to which the references are supposed to refer;

executing the instructions and data; and when a reference in the table of purportedly microprocessor safe references is encountered during execution of the instructions and data, determining if the reference is actually to a domain to which that reference is supposed to refer.

55. A method as in claim 54, wherein the instructions and data comprise interpretable code.

56. A method as in claim 54, wherein the instructions and data are for execution by a virtual machine, and wherein the virtual machine performs the method.

57. A method as in claim 54, wherein the plural domains include a network domain comprising network functions and data referred to by the network functions, a storage domain comprising storage functions and data referred to by the storage functions, and a filesystem domain comprising other functions and data referred to by the other functions.

58. A method as in claim 57, wherein the plural domains further comprise a multiprocessor safe domain, and wherein instructions and data that involve references to the multiprocessor safe domain are considered to be multiprocessor safe references.

59. A method as in claim 54, further comprising the steps of:

determining which of the references outside of their domains are multiprocessor unsafe references; and generating a report of the multiprocessor unsafe references.

60. A method as in claim 59, further comprising the step of modifying the instructions and data based on the report.

61. A method as in claim 54, wherein if the reference is not actually to a domain to which that reference is supposed to refer, execution of the instructions and data halts and an error message is generated.

62. A method as in claim 54, wherein if the reference is not actually to a domain to which that reference is supposed to refer, the instruction or data making the reference is modified.

63. A method as in claim 62, wherein the instruction or data making the reference is re-executed after being modified.

64. A memory storing information including first instructions executable by a processor to perform steps to analyze second instructions and data for a program and dynamically determine where the second instructions and data might result in incorrect results when run on a multiprocessor system, the steps comprising:

dividing the second instructions and data for the program into plural domains based on symbols used to refer to the second instructions and data, the multiprocessor system configured to use at most one processor at a time to execute instructions and to access data from any one domain;

determining which of the second instructions and data involve references outside of their domains;

determining which of the references outside of their domains are purportedly multiprocessor safe references;

generating a table of the purportedly multiprocessor safe references, the table including the domains to which the references are supposed to refer;

executing the second instructions and data; and when a reference in the table of purportedly microprocessor safe references is encountered during execution of the second instructions and data, determining if the reference is actually to a domain to which that reference is supposed to refer.

65. A memory as in claim 64, wherein the second instructions and data comprise interpretable code.

66. A memory as in claim 64, wherein the second instructions and data are for execution by a virtual machine, and wherein the virtual machine performs the steps.

67. A memory as in claim 64, wherein the plural domains include a network domain comprising network functions and data referred to by the network functions, a storage domain comprising storage functions and data referred to by the storage functions, and a filesystem domain comprising other functions and data referred to by the other functions.

68. A memory as in claim 67, wherein the plural domains further comprise a multiprocessor safe domain, and wherein instructions and data that involve references to the multiprocessor safe domain are considered to be multiprocessor safe references.

69. A memory as in claim 64, wherein the first instructions further comprise instructions to cause the processor to perform the steps of:

determining which of the references outside of their domains are multiprocessor unsafe references; and generating a report of the multiprocessor unsafe references.

70. A memory as in claim 69, further comprising the step of modifying the second instructions and data based on the report.

71. A memory as in claim 64, wherein if the reference is not actually to a domain to which that reference is supposed to refer, execution of the second instructions and data halts and an error message is generated.

72. A memory as in claim 64, wherein if the reference is not actually to a domain to which that reference is supposed to refer, the instruction or data making the reference is modified.

73. A memory as in claim 72, wherein the instruction or data making the reference is re-executed after being modified.

74. A computer system for analyzing instructions and data for a program and dynamically determining where the instructions and data might result in incorrect results when run on a multiprocessor system, the computer system comprising a processor and, executable by the processor:

a reference analyzer that divides the instructions and data for the program into plural domains based on symbols used to refer to those instructions and data, the multiprocessor system configured to use at most one processor at a time to execute instructions and to access data from any one domain, that determines which of the instructions and data involve references outside of their domains, and that determines which of the references outside of their domains are purportedly multiprocessor safe references;

a table generator that generates a table of the purportedly multiprocessor safe references, the table including the domains to which the references are supposed to refer;

a reference tracker that tracks references made by the instructions and data; and a comparator that determines, when a reference in the table of purportedly microprocessor safe references is encountered during execution of the instructions and data, if the reference is actually to a domain to which that reference is supposed to refer.

75. A computer system as in claim 74, wherein the instructions and data comprise interpretable code.

76. A computer system as in claim 74, wherein the instructions and data are for execution by a virtual machine, and wherein the virtual machine implements the system.

77. A computer system as in claim 74, wherein the plural domains include a network domain comprising network functions and data referred to by the network functions, a storage domain comprising storage functions and data referred to by the storage functions, and a filesystem domain comprising other functions and data referred to by the other functions.

78. A computer system as in claim 77, wherein the plural domains further comprise a multiprocessor safe domain, and wherein instructions and data that involve references to the multiprocessor safe domain are considered to be multiprocessor safe references.

79. A computer system as in claim 74, wherein the reference analyzer further determines which of the references outside of their domains are multiprocessor unsafe references, and wherein the system further comprises a report generator that generates a report of the multiprocessor unsafe references.

80. A computer system as in claim 79, further comprising a modifier that modifies the instructions and data based on the report.

81. A computer system as in claim 74, wherein if the reference is not actually to a domain to which that reference is supposed to refer, execution of the instructions and data halts and an error message is generated.

82. A computer system as in claim 74, further comprising a modifier that, if the reference is not actually to a domain to which that reference is supposed to refer, modifies the instruction or data making the reference.

83. A computer system as in claim 82, wherein the instruction or data making the reference is re-executed after being modified.

84. A method of analyzing instructions and data for a program to determine where the instructions and data might result in incorrect results when run on a system having multiple resources of a type used concurrently, the method comprising the steps of:

dividing the instructions and data for the program into plural domains based on symbols used to refer to those instructions and data, the system configured to use at more one of the resources at a time to execute instructions and to access data from any one domain;

determining which of the instructions and data involve references outside of their domains;

determining which of the references outside of their domains are unsafe references;

generating a report of the unsafe references; and modifying the instructions and data based on the report.

85. A method of dynamically analyzing instructions and data for a program to determine where the instructions and data result in domain violations when run on a multiprocessor system, the method comprising the steps of:

dividing the instructions and data for the program into plural domains based on symbols used to refer to those instructions and data, the multiprocessor system configured to use at most one processor at a time to execute instructions and to access data from any one domain;

accessing a table of purportedly microprocessor safe references by the instructions and data outside of their domains, the table including the domains to which the references are supposed to refer;

executing the instructions and data; and when a reference in the table of purportedly microprocessor safe references is encountered during execution of the instructions and data, determining if the reference is actually to a domain to which that reference is supposed to refer.

86. A method as in claim 85, wherein the instructions and data comprise interpretable code.

87. A method ad in claim 85, wherein the instructions and data are for execution by a virtual machine, and wherein the virtual machine performs the method.

88. A method as in claim 85, wherein the plural domains include a network domain comprising network functions and data referred to by the network functions, a storage domain comprising storage functions and data referred to by the storage functions, and a filesystem domain comprising other functions and data referred to by the other functions.

89. A method as in claim 88, wherein the plural domains further comprise a multiprocessor safe domain, and wherein instructions and data that involve references to the multiprocessor safe domain are considered to be multiprocessor safe references.

90. A method as in claim 85, wherein if the reference is not actually to a domain to which that reference is supposed to refer, execution of the instructions and data halts and an error message is generated.

91. A method as in claim 85, wherein if the reference is not actually to a domain to which that reference is supposed to refer, the instruction or data making the reference is modified.

92. A method as in claim 91, wherein the instruction or data making the reference is re-executed after being modified.

93. A memory storing information including steps executable by a processor, the steps executable to dynamically analyze instructions and data for a program to determine where the instructions and data result in domain violations when run on a multiprocessor system, the steps comprising:

dividing the instructions and data for the program into plural domains based on symbols used to refer to those instructions and data, the multiprocessor system configured to use at most one processor at a time to execute instructions and to access data from any one domain;

accessing a table of purportedly microprocessor safe references by the instructions and data outside of their domains, the table including the domains to which the references are supposed to refer;

executing the instructions and data; and when a reference in the table of purportedly microprocessor safe references is encountered during execution of the instructions and data, determining if the reference is actually to a domain to which that reference is supposed to refer.

94. A memory as in claim 93, wherein the instructions and data comprise interpretable code.

95. A memory as in claim 93, wherein the instructions and data are for execution by a virtual machine, and wherein the virtual machine performs the steps.

96. A memory as in claim 93, wherein the plural domains include a network domain comprising network functions and data referred to by the network functions, a storage domain comprising storage functions and data referred to by the storage functions, and a filesystem domain comprising other functions and data referred to by the other functions.

97. A memory as in claim 96, wherein the plural domains further comprise a multiprocessor safe domain, and wherein instructions and data that involve references to the multiprocessor safe domain are considered to be multiprocessor safe references.

98. A memory as in claim 93, wherein if the reference is not actually to a domain to which that reference is supposed to refer, execution of the instructions and data halts and an error message is generated.

99. A memory as in claim 93, wherein if the reference is not actually to a domain to which that reference is supposed to refer, the instruction or data making the reference is modified.

100. A memory as in claim 99, wherein the instruction or data making the reference is re-executed after being modified.

101. A computer system comprising a processor and a checker to cause the processor to dynamically analyze instructions and data for a program to determine where the instructions and data result in domain violations when run on a multiprocessor system, the checker comprising:
 an analyzer that divides the instructions and data for the program into plural domains based on symbols used to refer to those instructions and data, the multiprocessor system configured to use at most one processor at a time to execute instructions and to access data from any one domain;
 an interface to a table of purportedly microprocessor safe references by the instructions and data outside of their domains, the table including the domains to which the references are supposed to refer; and
 a reference tracker that tracks references made by the instructions and data; and
 a comparator that determines, when a reference in the table of purportedly microprocessor safe references is encountered during execution of the instructions and data, if the reference is actually to a domain to which that reference is supposed to refer.

102. A computer system as in claim 101, wherein the instructions and data comprise interpretable code.

103. A computer system as in claim 101, wherein the instructions and data are for execution by a virtual machine, and wherein the virtual machine includes the checker.

104. A computer system as in claim 101, wherein the plural domains include a network domain comprising network functions and data referred to by the network functions, a storage domain comprising storage functions and data referred to by the storage functions, and a filesystem domain comprising other functions and data referred to by the other functions.

105. A computer system as in claim 104, wherein the plural domains further comprise a multiprocessor safe domain, and wherein instructions and data that involve references to the multiprocessor safe domain are considered to be multiprocessor safe references.

106. A computer system as in claim 101, wherein if the reference is not actually to a domain to which that reference is supposed to refer, execution of the instructions and data halts and an error message is generated.

107. A computer system as in claim 101, further comprising a modifier that, if the reference is not actually to a domain to which that reference is supposed to refer, modifies the instruction or data making the reference.

108. A computer system as in claim 107, wherein the instruction or data making the reference is re-executed after being modified.

109. A computer system as in claim 101, wherein the checker is embodied as a function in the instructions and data.

110. A computer system as in claim 101, wherein the checker runs concurrently with execution of the instructions and data.

111. A method of dynamically analyzing instructions and data for a program to determine where the instructions and data result in domain violations when run on a system having multiple resources of a type used concurrently, the method comprising the steps of:
 dividing the instructions and data for the program into plural domains based on symbols used to refer to those instructions and data, the system configured to use at most one of the resources at a time to execute instructions and to access data from any one domain;
 accessing a table of purportedly safe references by the instructions and data outside of their domains, the table including the domains to which the references are supposed to refer;
 executing the instructions and data; and
 when a reference in the table of purportedly safe references is encountered during execution of the instructions and data, determining if the reference is actually to a domain to which that reference is supposed to refer.

* * * * *